United States Patent
You et al.

(10) Patent No.: US 10,631,174 B2
(45) Date of Patent: Apr. 21, 2020

(54) METHOD FOR REPETITIVE TRANSMISSION OF CHANNEL FOR COVERAGE EXTENSION, AND TERMINAL

(71) Applicant: LG ELECTRONICS INC., Seoul (KR)

(72) Inventors: Hyangsun You, Seoul (KR); Yunjung Yi, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 15/110,611

(22) PCT Filed: Feb. 23, 2015

(86) PCT No.: PCT/KR2015/001713
§ 371 (c)(1),
(2) Date: Jul. 8, 2016

(87) PCT Pub. No.: WO2015/126202
PCT Pub. Date: Aug. 27, 2015

(65) Prior Publication Data
US 2016/0330633 A1 Nov. 10, 2016

Related U.S. Application Data

(60) Provisional application No. 61/943,507, filed on Feb. 24, 2014.

(51) Int. Cl.
*H04J 11/00* (2006.01)
*H04L 1/08* (2006.01)
(Continued)

(52) U.S. Cl.
CPC ......... *H04W 16/26* (2013.01); *H04J 11/0079* (2013.01); *H04L 1/08* (2013.01);
(Continued)

(58) Field of Classification Search
CPC ....... H04W 16/26; H04W 4/005; H04W 4/70; H04L 5/001; H04L 1/00; H04L 5/0082; H04L 5/0053; H04L 1/08; H04J 11/0079
See application file for complete search history.

(56) References Cited

U.S. PATENT DOCUMENTS

| | | |
|---|---|---|
| 2013/0210467 A1 | 8/2013 | Kim et al. |
| 2014/0086173 A1* | 3/2014 | Sadeghi ............... H04L 5/005 370/329 |

(Continued)

FOREIGN PATENT DOCUMENTS

| | | |
|---|---|---|
| CN | 103209062 A | 7/2013 |
| KR | 10-2012-0041141 A | 4/2012 |

(Continued)

OTHER PUBLICATIONS

Huawei et al., "Determining the repetition level during initial random access and non-initial random access", RI-135382, 3GPP TSG RAN WGI Meeting #75, San Francisco, USA, Nov. 1, 2013, pp. 1-4.

(Continued)

*Primary Examiner* — Moo Jeong
(74) *Attorney, Agent, or Firm* — Birch, Stewart, Kolasch & Birch, LLP

(57) ABSTRACT

An embodiment of the present specification provides a method for setting a repetition level of a physical uplink control channel (PUCCH) by a terminal. The method is a method for transmitting a PUCCH by a terminal, comprising a step of determining a repetition level for transmission of the PUCCH containing uplink control information; and a step of repeatedly transmitting the PUCCH on a predetermined number of uplink sub-frames according to the repetition level for the PUCCH, wherein the repetition level for the PUCCH may be determined on the basis of at least one of the previously received PDCCH, EPDCCH, PDSCH and the previously transmitted PUSCH.

15 Claims, 19 Drawing Sheets

(51) Int. Cl.
*H04L 5/00* (2006.01)
*H04W 16/26* (2009.01)
*H04W 4/70* (2018.01)

(52) U.S. Cl.
CPC ............ *H04L 5/001* (2013.01); *H04L 5/0053* (2013.01); *H04L 5/0082* (2013.01); *H04W 4/70* (2018.02)

(56) References Cited

U.S. PATENT DOCUMENTS

| 2016/0242150 | A1* | 8/2016 | Kang | ........................ | H04L 27/26 |
| 2016/0338110 | A1* | 11/2016 | Wang | ........................ | H04L 1/189 |
| 2016/0353440 | A1* | 12/2016 | Lee | ........................... | H04W 4/70 |
| 2017/0181009 | A1* | 6/2017 | Wong | ..................... | H04L 1/0003 |

FOREIGN PATENT DOCUMENTS

| WO | WO 2015/072774 A1 | 5/2015 |
| WO | WO 2015/093907 A1 | 6/2015 |

OTHER PUBLICATIONS

LG Electronics, "PRACH transmission for MTC coverage enhancement", RI-140304, 3GPP TSG RAN WG1 Meeting #76, Prague, Czech Republic, Feb. 1, 2014, pp. 1-4.

ZTE, "Discussion on PUCCH Coverage Improvement", RI-140275, 3GPP TSG RAN WG1 Meeting #76, Prague, Czech Republic, Feb. 1, 2014, pp. 1-4.

Alcatel-Lucent, Alcatel-Lucent Shanghai Bell, "Coverage enhancement for PDSCH", R1-140156, 3GPP TSG-RAN WG1 Meeting #76, Prague, Czech Republic, Feb. 10-14, 2014, pp. 1-2.

LG Electronics, "PDSCH transmission for MTC coverage enhancement", R1-140309, 3GPP TSG RAN WG1 Meeting #76, Prague, Czech Republic, Feb. 10-14, 2014, pp. 1-5.

Samsung, "PDSCH/PUSCH Coverage Enhancements for MTC UEs" R1-140358, 3GPP TSG RAN WG1 #76, Prague, Czech Republic, Feb. 10-14, 2014, pp. 1-3.

* cited by examiner

US 10,631,174 B2

METHOD FOR REPETITIVE TRANSMISSION OF CHANNEL FOR COVERAGE EXTENSION, AND TERMINAL

CROSS REFERENCE TO RELATED APPLICATIONS

This application is the National Phase of PCT International Application No. PCT/KR2015/001713, filed on Feb. 23, 2015, which claims priority under 35 U.S.C. 119(e) to U.S. Provisional Application No. 61/943,507, filed on Feb. 24, 2014, all of which are hereby expressly incorporated by reference into the present application.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, research on communication that is carried out between devices or between a device and a server without any human interaction, i.e., without any human intervention, i.e., machine type communication (MTC) has recently been extensively carried out. MTC refers to a concept of establishing communication between mechanical devices, and not equipments used by humans, by using the conventional wireless communication network.

Since the characteristics of the MTC are different from general user equipments, services that are optimized for the MTC may be different from services that are optimized for human-to-human communication. In comparison with the current Mobile Network Communication Service, the MTC can be characterized as different market scenarios, data communication, lower cost and less effort, a potentially large number of MTC devices, wider service areas, lower traffic per MTC device, and so on.

Recently, enhancing (or extending) the cell coverage of a base station has been considered, and diverse methods for cell coverage extension (or cell coverage enhancement) are being discussed. However, in case the coverage of the cell is extended (or enhanced) if the base station transmits a channel as when performing transmission to a general UE, a MTC device that is located in the cell coverage enhancement region may have difficulty in receiving the transmitted channel.

Additionally, it may be expected that the MTC devices have low performance in order to have its supply rate increased at lower costs. And, in case of transmitting the PDCCH, EPDCCH or PDSCH just as when transmitting to a general user equipment, the MTC device that is located in the cell coverage enhancement region may have difficulty in receiving the transmitted channel.

Additionally, in case the MTC device transmits PUCCH and PUSCH, which correspond to uplink channels, by using a general method, the base station may have difficulty in receiving the transmitted channel from the MTC device, which is located in the cell coverage enhancement region.

SUMMARY OF THE INVENTION

Technical Objects

The present invention has been made in an effort to solve the above-discussed problem.

Technical Solutions

In order to achieve the above-described object, according to a disclosure of this specification, a method of a user equipment for transmitting a PUCCH (Physical Uplink Control Channel) may include determining a repetition level for a transmission of a PUCCH including uplink channel information, and repeatedly transmitting the PUCCH on a predetermined number of uplink subframes in accordance with the repetition level for the PUCCH, wherein the repetition level for the PUCCH may be determined based on at least one of previously received PDCCH, EPDCCH, and PDSCH and previously transmitted PUSCH.

Herein, a transmission power for the PUCCH may be equally fixed within the predetermined number of uplink subframes.

Additionally, the previously received PDSCH may be scheduled by the previously received PDCCH or EPDCCH, and the PUCCH may include ACK/NACK information respective to the previously received PDSCH.

Additionally, the repetition level for the PUCCH may be determined based on a repetition level for a most recently received PDCCH or EPDCCH.

Additionally, the repetition level for the PUCCH may be determined based on a repetition level for a most recently received PDSCH or a most recently transmitted PUSCH.

Additionally, the previously received PDCCH may be received by monitoring multiple PDCCH candidates, and the previously received EPDCCH may be received by monitoring multiple EPDCCH candidates.

Additionally, the repetition level for the PUCCH may be determined based on a TAR (Total Aggregation Resource) value of a PDCCH candidate having the previously received PDCCH searched therein, among multiple PDCCH candidates, and a TAR value of the PDCCH candidate may be determined based on a repetition level for the previously received PDCCH and a number of resources per subframe.

Additionally, the repetition level for the PUCCH may be determined based on a TAR value of an EPDCCH candidate having the previously received EPDCCH searched therein, among multiple EPDCCH candidates, and a TAR value of the EPDCCH candidate may be determined based on a repetition level for the previously received EPDCCH and a number of resources per subframe.

Additionally, the repetition level respective to the PUCCH may be determined based on a maximum TAR value for the multiple PDCCH candidates, wherein the maximum TAR value may correspond to a TAR value having a maximum value among the TAR values for each of the multiple PDCCH candidates, and the TAR values for each of the multiple PDCCH candidates may be determined based on a repetition level and a number of resources per subframe for each of the multiple PDCCH candidates.

Additionally, the repetition level for the PUCCH may be determined based on a maximum TAR value for the multiple EPDCCH candidates, wherein the maximum TAR value may correspond to a TAR value having a maximum value among the TAR values for each of the multiple EPDCCH candidates, and the TAR values for each of the multiple EPDCCH candidates may be determined based on a repetition level and a number of resources per subframe for each of the multiple EPDCCH candidates.

Additionally, the repetition level respective to the PUCCH may be determined based on a TPC (Transmit Power Control) field of DCI (Downlink Control Information) included in the previously received PDCCH or EPDCCH, and each value being indicated by the TPC field may indicate a specific repetition level.

In order to achieve the above-described object, according to a disclosure of this specification, a user equipment for transmitting a PUCCH (Physical Uplink Control Channel) includes a RF unit, and a processor configured to control the RF unit, so as to determine a repetition level for a transmission of a PUCCH including uplink channel information, and to repeatedly transmit the PUCCH on a predetermined number of uplink subframes in accordance with the repetition level for the PUCCH, wherein the repetition level for the PUCCH may be determined based on at least one of previously received PDCCH, EPDCCH, and PDSCH and previously transmitted PUSCH.

Effects of the Invention

According to the disclosure of this specification, the above-described problems of the related art may be resolved. Most particularly, according to the disclosure of this specification, the reception performance and the decoding performance of a MTC device (Machine Type Communication) device, which is positioned in a coverage enhancement region of a base station, may be enhanced.

DESCRIPTION OF EXEMPLARY EMBODIMENTS

Figure 1:
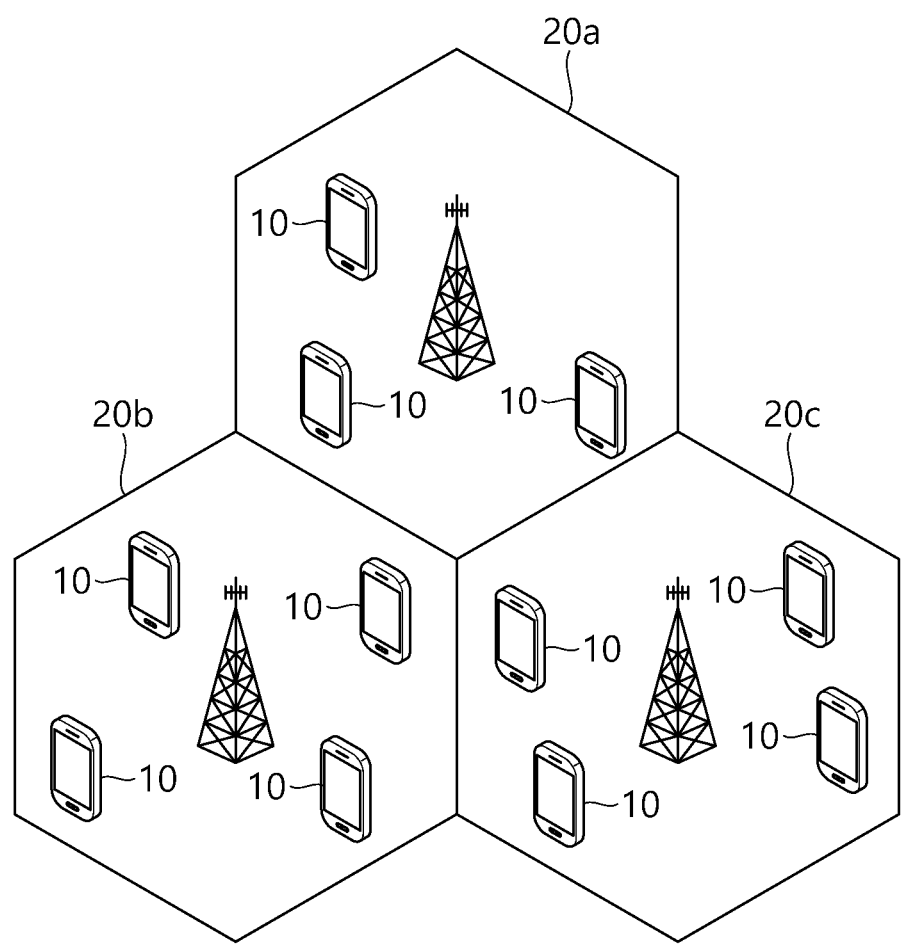
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively determined based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
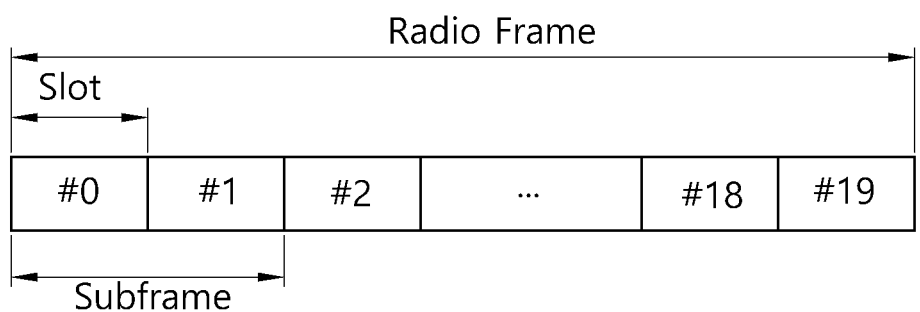
FIG. 2 illustrates a structure of a radio frame according to an FDD in a 3GPP LTE.

FIG. 2 Shows a Downlink Radio Frame Structure According to FDD Of 3rd Generation Partnership Project (3GPP) Long Term Evolution (LTE).

The radio frame of FIG. 2 may be found in the section 5 of 3GPP TS 36.211 V10.4.0 (2011 December) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
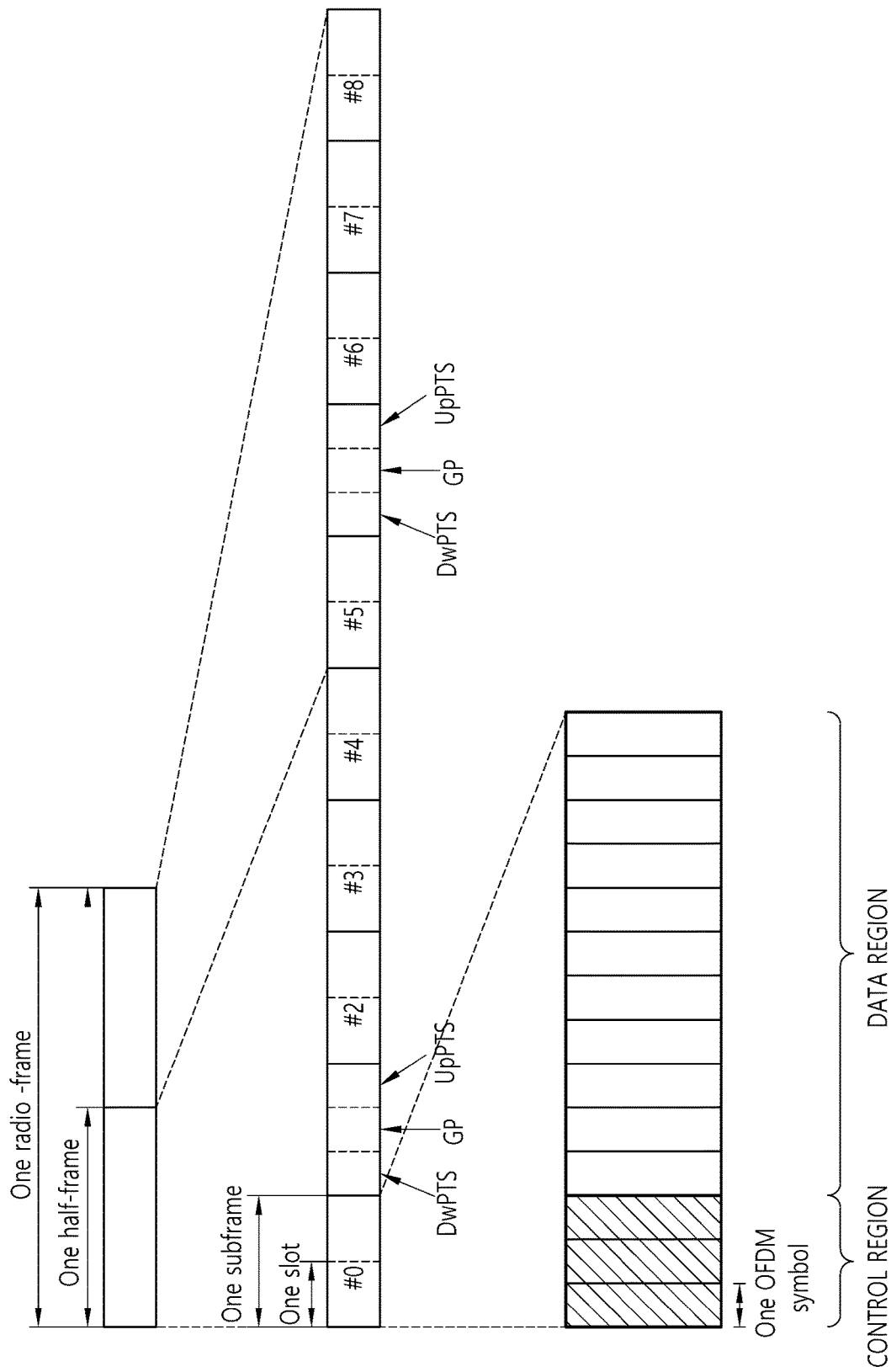
FIG. 3 illustrates the architecture of a downlink radio frame according to TDD in 3GPP LTE.

FIG. 3 Illustrates the Architecture of a Downlink Radio Frame According to TDD in 3GPP LTE.

For this, 3GPP TS 36.211 V8.7.0 (2009 May) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

Figure 4:
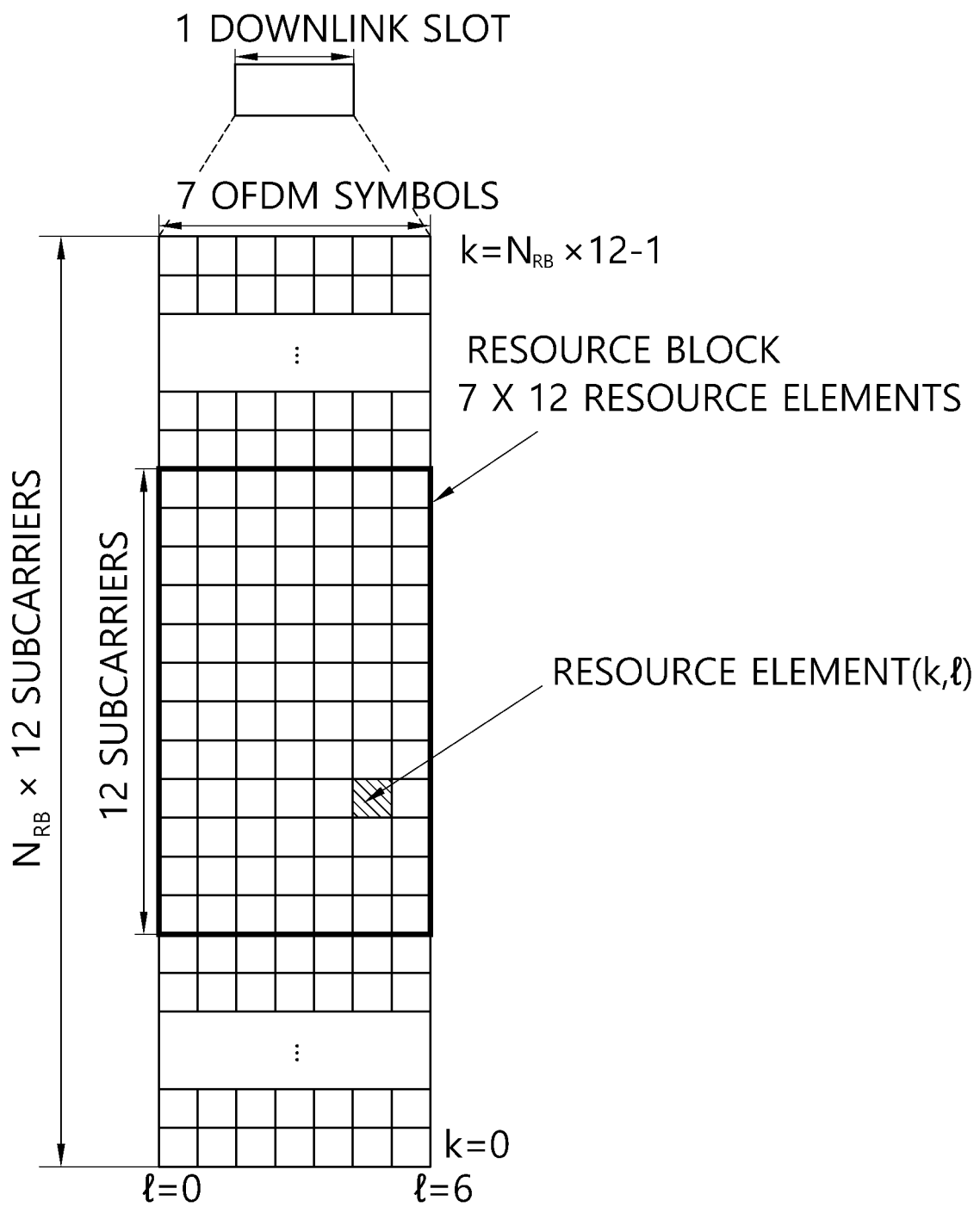
FIG. 4 is an exemplary diagram illustrating a resource grid with respect to one uplink or downlink slot in a 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Figure 5:
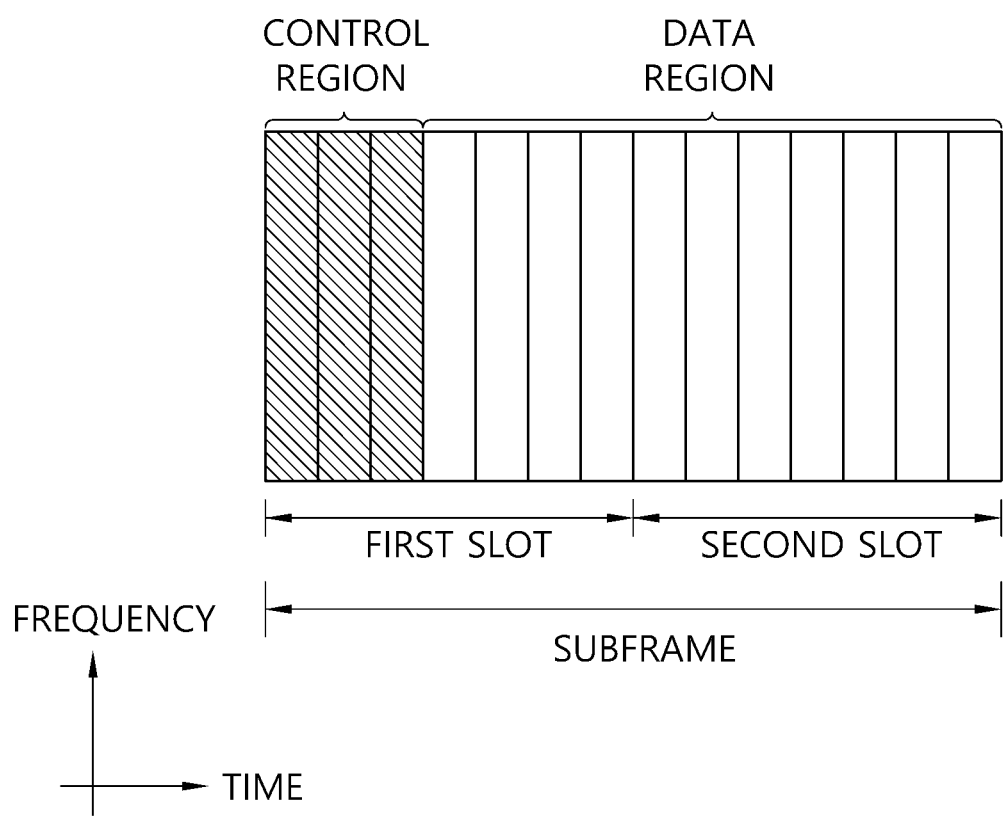
FIG. 5 illustrates the architecture of a downlink subframe.

FIG. 5 Illustrates the Architecture of a Downlink Sub-Frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

Figure 6:
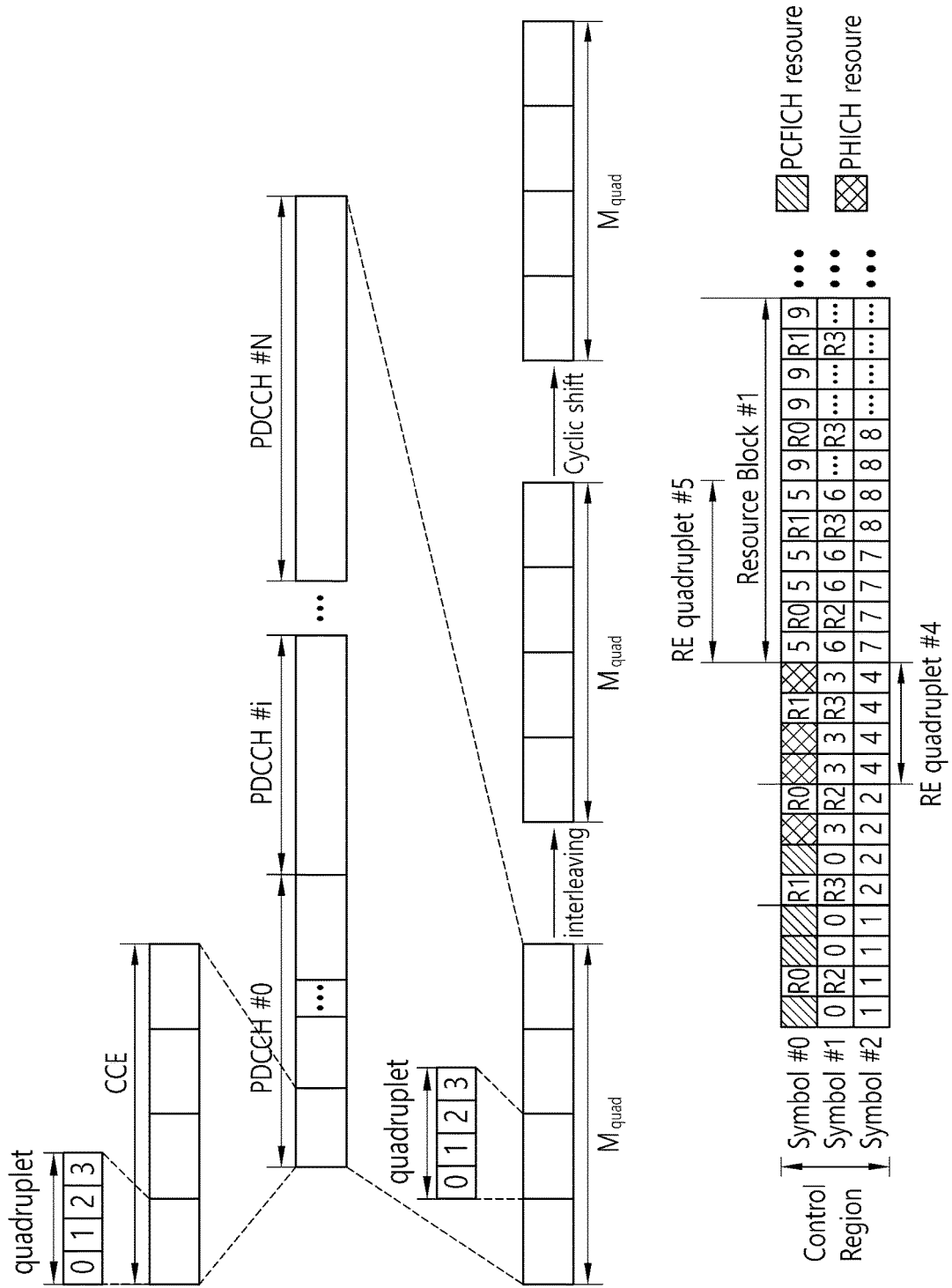
FIG. 6 illustrates an exemplary of resource mapping of a PDCCH.

FIG. 6 Illustrates an Exemplary of Resource Mapping of a PDCCH.

R0 indicates a reference signal of a first antenna, R1 indicates a reference signal of a second antenna, R2 indicates a reference signal of a third antenna, and R3 indicates a reference signal of a fourth antenna.

A control region within a subframe includes a plurality of CCEs(control channel elements). A CCE refers to a logical allocation unit that is used for providing the PDCCH with a coding rate respective to the state of the radio channel, and the CCE corresponds to a plurality of REGs (resource element groups). A REG includes a plurality of resource elements. Depending on the co-relation between the number of CCEs and a coding rate that is being provided by the CCEs, a format of the PDCCH and a number of bits of an available PDCCH are determined.

The number of CCEs that is used for the transmission of the PDCCH is determined by the base station in accordance with the channel state. For example, for a user equipment having a good downlink channel state, one CCE may be used for the PDCCH transmission. For a user equipment having a poor downlink channel state, 8 CCEs may be used for the PDCCH transmission.

One REG (being indicated as a quadruplet in the drawing) includes 4 REs, and one CCE includes 9 REGs. In order to configured one PDCCH, {1, 2, 4, 8} CCEs may be used, and each of the elements {1, 2, 4, 8} is referred to as a CCE aggregation level.

A control channel that is configured of one or more CCEs performs REG-unit interleaving and, then, is mapped to a physical resource after having a cell-ID based cyclic shift performed thereon.

Figure 7:
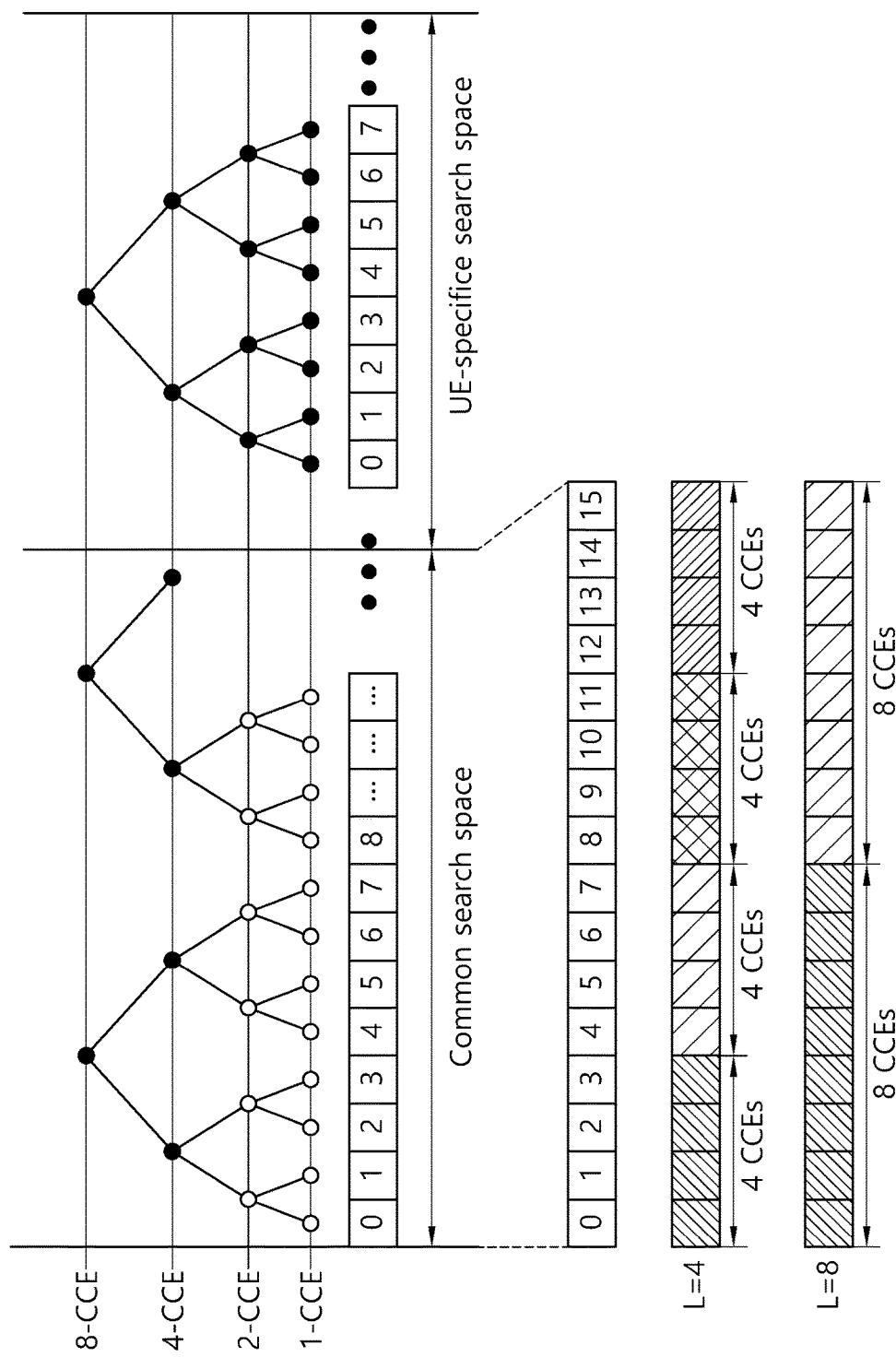
FIG. 7 illustrates an exemplary diagram showing monitoring of the PDCCH.

FIG. 7 Illustrates an Exemplary Diagram Showing Monitoring of the PDCCH.

The user equipment is incapable of knowing from which location within the control region its PDCCH is being transmitted and by using which CCE aggregation level or DCI format. Since multiple PDCCHs may be transmitted within one subframe, the user equipment monitors multiple PDCCHs for each subframe. Herein, monitoring refers to the user equipment attempting to decode the PDCCH in accordance with the PDCCH format.

In 3GPP LTE, in order to reduce any load (or burden) caused by blind decoding, a search space is used. The search space may also be referred to as a monitoring set of the CCE for the PDCCH. The user equipment monitors the PDCCH within the corresponding search space.

The search space is divided into a common search space and a UE-specific search space. The common search space corresponds to a space searching a PDCCH having common control information, and the common search space is configured of 16 CCEs corresponding to CCE indexes 0-15 and supports a PDCCH having a CCE aggregation level of {4, 8}. However, a PDCCH (DCI formats 0 and 1A) carrying UE-specific information may also be transmitted to the common search space. The UE-specific search space supports a PDCCH having a CCE aggregation level of {1, 2, 4, 8}.

Table 2 shown below indicates a number of PDCCH candidates being monitored by a wireless device.

TABLE 2

| Type | Search space $S^{(L)}_k$ Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |

TABLE 2-continued

| Type | Search space $S^{(L)}_k$ Aggregation Level L | Size [in CCEs] | Number of PDCCH candidates $M^{(L)}$ |
|---|---|---|---|
| Common | 4 | 16 | 4 |
|  | 8 | 16 | 2 |

The size of the search space is determined by Table 2, and the starting point of the search space is defined differently for the common search space and the UE-specific search space. Although the starting point of the common search space is fixed regardless of the subframe, the starting point of the UE-specific search space may vary for each subframe in accordance with a UE identifier (e.g., C-RNTI), a CCE aggregation level, and/or a slot number within a radio frame. In case the starting point of the UE-specific search space is located within the common search space, the UE-specific search space and the common search space may overlap one another.

In the aggregation level $L \in \{1,2,4,8\}$, the search space $S^{(L)}_k$ is defined as a set (or group) of PDCCH candidates. The CCE corresponding to PDCCH candidate m of the search space $S^{(L)}_k$ is given as described below.

$$L\{(Y_k+m') \bmod \lfloor N_{CCE,k}/L \rfloor\}+i \qquad \text{Equation 1}$$

Herein, $i=0,1,\ldots,L-1$, $m=0,\ldots,M^{(L)}-1$, and $N_{CCE,k}$ represents a total number of CCEs that can be used for the transmission of the PDCCH within the control region of subframe k. The control region includes a set of CCEs being numbered from 0 to $N_{CCE,k}-1$. $M^{(L)}$ represents a number of PDCCH candidates at CCE aggregation level L in a given search space.

When a CIF (carrier indicator field) is configured in a wireless device, then, $m'=m+M^{(L)}n_{cif}$. $n_{cif}$ represents a value of the CIF. If the CIF is not configured in the wireless device, then, $m'=m$.

In the common search space, $Y_k$ is set (or configured) to 0 with respect to 2 aggregation levels L=4 and L=8.

In the UE-specific search space of the aggregation level L, the variable $Y_k$ s defined as described below.

$$Y_k=(A \cdot Y_{k-1}) \bmod D \qquad \text{Equation 2}$$

Herein, $Y_{-1}=n_{RNTI} \neq 0$, A=39827, D=65537, $k=\text{floor}(n_s/2)$, and $n_s$ represents a slot number within a radio frame.

When the user equipment monitors the PDCCH based on the C-RNTI, the DCI format that is to be monitored and the search space are determined in accordance with the transmission mode of the PDSCH.

Meanwhile, when the user equipment monitors the PDCCH based on the C-RNTI, the DCI format that is to be monitored and the search space are determined in accordance with the transmission mode (TM) of the PDSCH. The following Table shows an example of monitoring the PDCCH having a C-RNTI configured therein.

TABLE 3

| Transmission Mode | DCI Format | Search Space | Transmission mode of PDSCH with respect to the PDCCH |
|---|---|---|---|
| Transmission Mode 1 | DCI Format 1A | Common and UE-specific | Single antenna port, Port 0 |
|  | DCI Format 1 | UE-specific | Single antenna port, Port 0 |
| Transmission Mode 2 | DCI Format 1A | Common and UE-specific | Transmit diversity |
|  | DCI Format 1 | UE-specific | Transmit diversity |

TABLE 3-continued

| Transmission Mode | DCI Format | Search Space | Transmission mode of PDSCH with respect to the PDCCH |
|---|---|---|---|
| Transmission Mode 3 | DCI Format 1A | Common and UE-specific | Transmit diversity |
| | DCI Format 2A | UE-specific | CDD (Cyclic Delay Diversity) or Transmit diversity |
| Transmission Mode 4 | DCI Format 1A | Common and UE-specific | Transmit diversity |
| | DCI Format 2 | UE-specific | Closed-loop spatial multiplexing |
| Transmission Mode 5 | DCI Format 1A | Common and UE-specific | Transmit diversity |
| | DCI Format 1D | UE-specific | MU-MIMO(Multi-user Multiple Input Multiple Output) |
| Transmission Mode 6 | DCI Format 1A | Common and UE-specific | Transmit diversity |
| | DCI Format 1B | UE-specific | Closed-loop spatial multiplexing |
| Transmission Mode 7 | DCI Format 1A | Common and UE-specific | If the number of PBCH transmission ports is equal to 1, Single antenna port, Port 0, if not, Transmit Diversity |
| | DCI Format 1 | UE-specific | Single antenna port, Port 5 |
| Transmission Mode 8 | DCI Format 1A | Common and UE-specific | If the number of PBCH transmission ports is equal to 1, Single antenna port, Port 0, if not, Transmit Diversity |
| | DCI Format 2B | UE-specific | Dual layer transmission (Port 7 or 8), or Single antenna port, Port 7 or 8 |
| Transmission Mode 9 | DCI Format 1A | Common and UE-specific | Non-MBSFN Subframe: If the number of PBCH antenna ports is equal to 1, Port 0 is used as a single antenna port, and, if not, Transmit Diversity<br>MBSFN Subframe: Port 7 as a single antenna port |
| | DCI Format 2C | UE-specific | Up to 8 transmission layers, Ports 7-14 are used, or Port 7 or Port 8 is used as a single antenna port |
| Transmission Mode 10 | DCI Format 1A | Common and UE-specific | Non-MBSFN Subframe: If the number of PBCH antenna ports is equal to 1, Port 0 is used as a single antenna port, and, if not, Transmit Diversity<br>MBSFN Subframe: Port 7 as a single antenna port |
| | DCI Format 2D | UE-specific | Up to 8 transmission layers, Ports 7-14 are used, or Port 7 or Port 8 is used as a single antenna port |

The purposes of the DCI formats are differentiated as shown in the following table.

TABLE 4

| DCI Format | Content |
|---|---|
| DCI Format 0 | Used for PUSCH scheduling |
| DCI Format 1 | Used for scheduling of one PDSCH codeword |
| DCI Format 1A | Used for compact scheduling of one PDSCH codeword and random access procedure |
| DCI Format 1B | Used for compact scheduling of one PDSCH codeword having precoding information |
| DCI Format 1C | Used for a very compact scheduling of one PDSCH codeword |
| DCI Format 1D | Used for compact scheduling of one PDSCH codeword having precoding and power offset information |
| DCI Format 2 | Used for PDSCH scheduling of user equipments that are set to the Closed-loop spatial multiplexing mode |
| DCI Format 2A | Used for PDSCH scheduling of user equipments that are set to the Open-loop spatial multiplexing mode |
| DCI Format 2B | DCI Format 2B is used for the resource allocation for dual-layer beamforming of the PDSCH. |
| DCI Format 2C | DCI Format 2C is used for the resource allocation for Closed-loop SU-MIMO or MU-MIMO operations of up to 8 layers. |
| DCI Format 2D | DCI Format 2D is used for the resource allocation of up to 8 layers. |
| DCI Format 3 | Used for the transmission of TPC commands of PUCCH and PUSCH having 2-bit power adjustments |
| DCI Format 3A | Used for the transmission of TPC commands of PUCCH and PUSCH having 1-bit power adjustments |
| DCI Format 4 | Used for PUSCH scheduling of an uplink (UL) cell operating in the multiple antenna port transmission mode |

Figure 8:
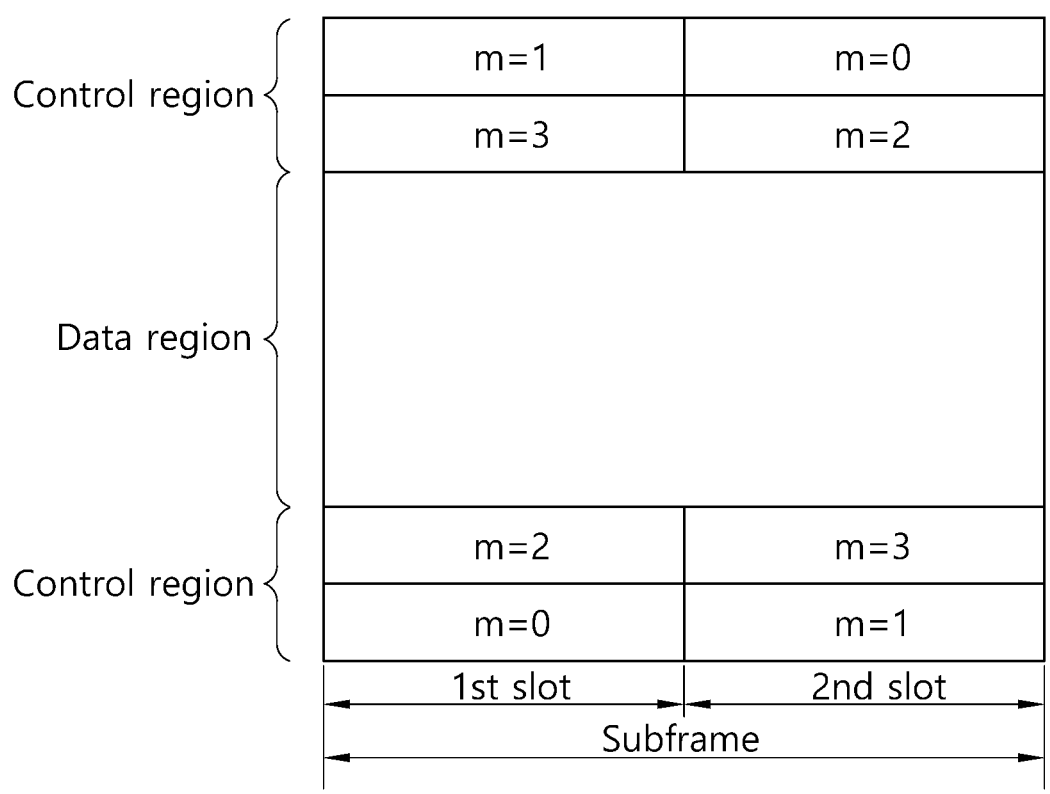
FIG. 8 illustrates a structure of an uplink subframe in 3GPP LTE.

FIG. 8 Illustrates a Structure of an Uplink Subframe in 3GPP LTE.

Referring to FIG. 8, an uplink subframe may be divided into a control region and a data region in a frequency domain. The control region is allocated with a PUCCH (Physical Uplink Control Channel) for transmitting uplink control information. The data region is allocated with a PUSCH (Physical Uplink Shared Channel) for transmitting data (in some cases, the control information may also be transmitted along with the data).

The PUCCH respective to one UE is allocated in resource block pairs (RB pairs) in a subframe. The resource blocks belonging to the resource block pair respectively occupy different sub-carriers within a first slot and a second slot. The frequency that is occupied by the resource blocks belonging to the resource block pair that is allocated to the PUCCH is varied based on the slot boundary. This is referred to as the RB pair that is allocated to the PUCCH as being frequency-hopped at the slot boundary.

By transmitting the uplink control information through different sub-carriers in accordance with time, the UE may obtain frequency diversity gain. m corresponds to a position index indicating a logical frequency domain position of a resource block pair that is allocated to the PUCCH within a subframe.

The uplink control information being transmitted over the PUCCH may include HARQ (hybrid automatic repeat request) ACK (acknowledgement)/NACK (non-acknowledgement), CQI (channel quality indicator) indicating a downlink channel state, SR (scheduling request), which corresponds to a request for uplink radio resource allocation, and so on.

The PUSCH is mapped to UL-SCH, which corresponds to a transport channel. Uplink data that are transmitted over the PUSCH may correspond to a transport block, which is a data block for the UL-SCH that is transmitted during a Transmission Time Interval (TTI). The transport block may correspond to user information. Alternatively, the uplink data may correspond to multiplexed data. The multiplexed data may correspond to a multiplexed result of the transport block for the UL-SCH and the control information. For example, the control information being multiplexed to the data mat include CQI, PMI (precoding matrix indicator), HARQ, RI (rank indicator), and so on. Alternatively, the uplink data may also be configured only of the control information.

Hereinafter, a carrier aggregation (CA) system will be described.

A carrier aggregation (CA) system refers to aggregating multiple component carriers (CCs). Due to such carrier aggregation, the significance of the conventional cell has changed. According to carrier aggregation, a cell may refer to a set of downlink component carrier and uplink component carrier, or a cell may refer to a single downlink component carrier.

Additionally, in carrier aggregation, a cell may be divided into a primary cell, a secondary cell, and a serving cell. A primary cell refers to a cell that operates in a primary frequency, or a cell through which the UE performs an initial connection establishment procedure or a connection re-establishment procedure with the base station, or a cell that is designated as a primary cell during a handover procedure. A secondary cell refers to a cell that operates in a secondary frequency, and, once the RRC connection is established, the secondary cell is configured and used for providing additional radio resources.

As described above, unlike the single carrier system, a carrier aggregation system may support multiple component carriers (CCs), i.e., multiple serving cells.

Such carrier aggregation system may support cross-carrier scheduling. Cross-carrier scheduling corresponds to a scheduling method that can perform resource allocation of a PDSCH through a PDCCH, which is transmitted through a specific component carrier, wherein the PDSCH is transmitted through another component carrier, or a scheduling method that can perform resource allocation of a PDSCH that is transmitted through a component carrier other than the component carrier being essentially linked to the specific component carrier.

Meanwhile, the PDCCH is monitored in a restricted (or limited) region, which is referred to as a control region, within a subframe, and, in order to perform demodulation of the PDCCH, a CRS that is transmitted in all bands is used. As the types of control information become more diverse, and as the size of the control information becomes larger, flexibility in the scheduling is degraded when only using the legacy PDCCH. Additionally, in order to reduce any burden caused by the CRS transmission, an EPDCCH (enhanced PDCCH) is being adopted.

Figure 9:
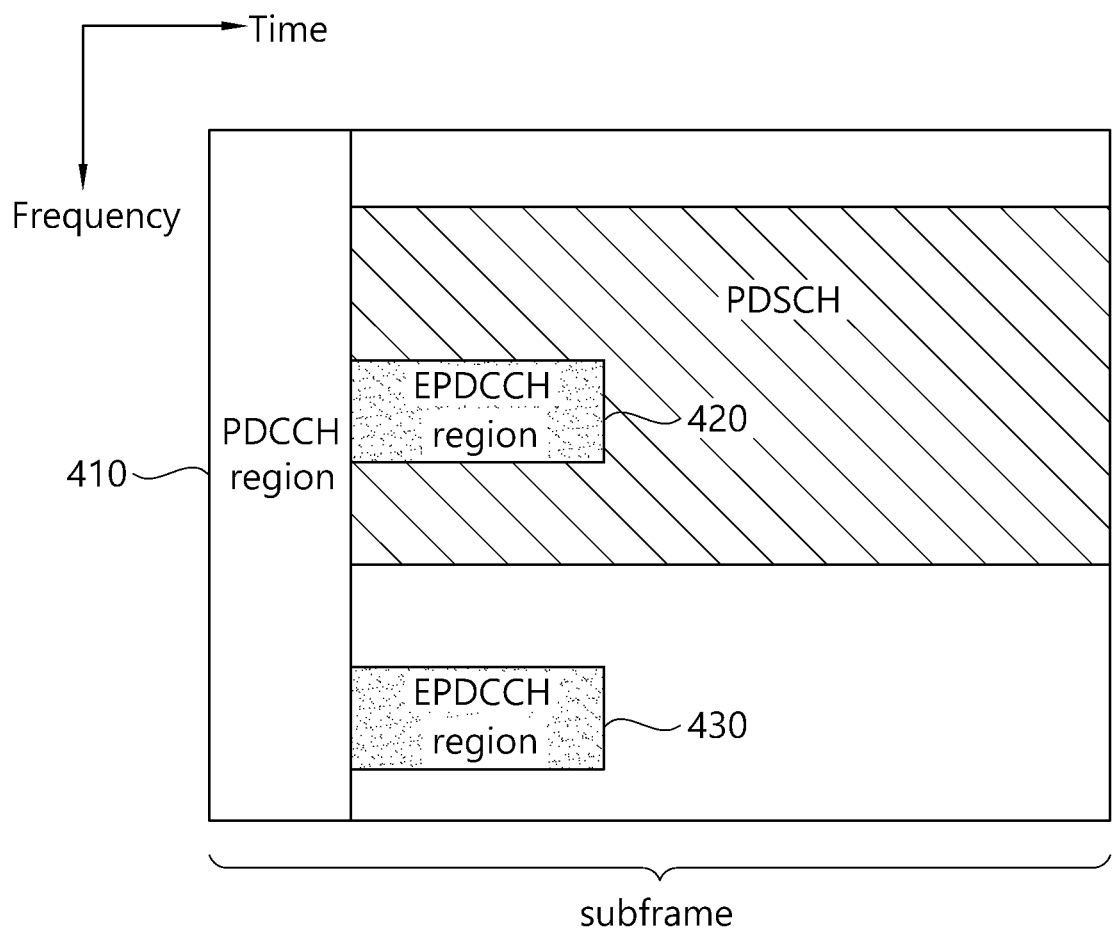
FIG. 9 illustrates an example of a subframe having an EPDCCH.

FIG. 9 Illustrates an Example of a Subframe Having an EPDCCH.

A subframe may include zero or one PDCCH region 410 and zero or more EPDCCH regions 420 and 430.

The EPDCCH regions 420 and 430 correspond to a region where the wireless device monitors the EPDCCH. Although the PDCCH region 410 is located within a maximum of 4 foremost OFDM symbols of the subframe, the EPDCCH regions 420 and 430 may be flexibly scheduled in the OFDM symbol after the PDCCH region 410.

One or more EPDCCH regions 420 and 430 are designated in a wireless device), and the wireless device may monitor the EPDCCH from the designated EPDCCH regions 420 and 430.

The number/location/size of the EPDCCH regions 420 and 430 and/or information on the subframe that is to monitor the EPDCCH may be notified by the base station to the wireless device through a RRC message, and so on.

In the PDCCH region 410, the PDCCH may be demodulated based on the CRS. In the EPDCCH regions 420 and 430, a DM (demodulation) RS may be defined instead of the CRS for the demodulation of the EPDCCH. An associated DM RS may be transmitted from the corresponding EPDCCH regions 420 and 430.

ARS sequence $r_{ns}(m)$ for the associated DM RS is as shown below in Equation 3.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{Equation 3}$$

Herein, m=0,1, . . . , $2N_{maxRB}-1$, $N_{maxRB}$ signifies a maximum number of RBs, ns represents a slot number within a radio frame, and l signifies an OFDM symbol number within a slot.

A pseudo-random sequence c(i) is defined by a Gold sequence having a length of 31, which is shown below.

At this point, m=0, 1, . . . , $12N_{RB}-1$, and $N_{RB}$ corresponds to a maximum number of RBs. A pseudo-random sequence generator may be initiated to $c_{init}=(\text{floor}(ns/2)+1)(2N_{EPDCCH,ID}+1)2^{16}+n_{EPDCCH,SCID}$ from the beginning of each subframe. ns represents a slot number within the radio frame, $N_{EPDCCH,ID}$ corresponds to a value that is associated with the EPDCCH set and is given from higher layer signaling, and $n_{EPDCCH,SCID}$ may be given as a specific value.

Each of the EPDCCH regions 420 and 430 may be used for the scheduling of cells that are different from one another. For example, the EPDCCH within the EPDCCH region 420 may carry scheduling information for the primary cell, and the EPDCCH of the EPDCCH region 430 may carry scheduling information for the secondary cell.

In the EPDCCH regions 420 and 430, when the EPDCCH is transmitted through multiple antennas, pre-coding that is identical to that of the EPDCCH may be applied to the DM RS within the EPDCCH regions 420 and 430.

In comparison with the PDCCH using the CCE in transmission resource units, the transmission resource unit for the EPCCH is referred to as an ECCE (Enhanced Control Channel Element). The aggregation level may be defined as a resource unit that monitors the EPDCCH. For example, when 1 ECCE is said to be the minimum resource for the EPDCCH, the aggregation level may be defined as L={1, 2, 4, 8, 16}.

Hereinafter, the EPDCCH search space may correspond to the EPDCCH region. In the EPDCCH search space, one or more EPDCCH candidates may be monitored for one or more aggregation levels.

Hereinafter, the resource allocation for the EPDCCH will be described in detail.

The EPDCCH is transmitted by using one or more ECCEs. An ECCE includes multiple EREGs (Enhanced Resource Element Groups). In accordance with the subframe type and CP respective to the TDD (Time Division Duplex) DL-UL configuration, an ECCE may include 4 EREGs or 8 EREGs. For example, in a normal CP, the ECCE may include 4 EREGs, and, in an extended CP, the ECCE may include 8 EREGs.

A PRB (Physical Resource Block) pair refers to two PRBs having the same RB number within one subframe. A PRB pair refers to a first PRB of a first slot and a second PRB of a second slot within the same frequency domain. In the normal CP, a PRB pair includes 12 sub-carriers and 14 OFDM symbols, and, therefore, includes 168 REs (resource elements).

Figure 10:
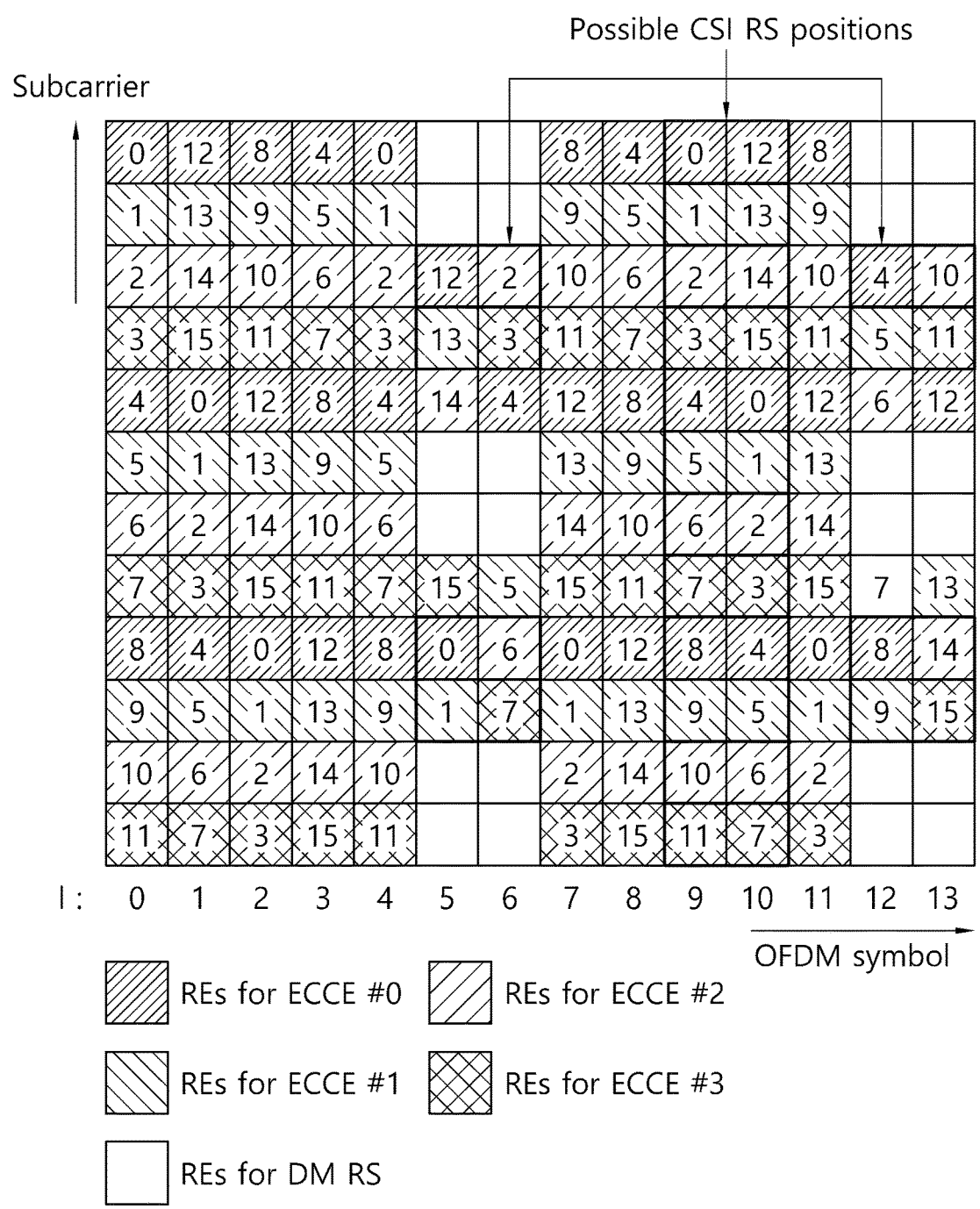
FIG. 10 illustrates an example of a PRB pair.

FIG. 10 Illustrates an Example of a PRB Pair.

Hereinafter, a subframe includes 2 slots, and, in one slot, although it is said that a PRB pair includes 7 OFDM symbols and 12 sub-carriers, the number of OFDM symbols and the number of sub-carriers are merely exemplary.

In one subframe, a PRB pair has a total of 168 REs. With the exception for the 24 REs for the DM RS, 16 EREGs are configured from 144 REs. Accordingly, 1 EREG may include 9 REs. However, apart from the DM RS, a CSI-RS or CRS may be positioned in one PRB pair. In this case, the number of available REs may be reduced, and the number of REs being included in 1 EREG may be reduced. Although the number of REs being included in an EREG may vary, the number of EREGs being included in one PRB pair, 16, does not vary.

At this point, as shown in FIG. 10, for example, RE indexes may be sequentially assigned starting from a first upper sub-carrier of a first left-side OFDM symbol (1=0) (or RE indexes may be sequentially assigned upward starting from a first lower sub-carrier of a first left-side OFDM symbol (1=0)). It will be assumed that indexes starting from 0 to 15 are assigned to 16 EREGs. At this point, 5 REs having RE index 0 are allocated to EREG 0. Similarly, 9 REs corresponding to RE index k(k=0, . . . , 15) are allocated to EREG k.

By grouping multiple EREGs, an EREG group is defined. For example, when an EREG group having 4 EREGs is defined, the EREG groups may be defined as EREG group #0={EREG 0, EREG 4, EREG 8, EREG 12}, EREG group #1={EREG 1, EREG 5, EREG 9, EREG 3}, EREG group #2={EREG 2, EREG 6, EREG 10, EREG 14}, and EREG group #3={EREG 3, EREG 7, EREG 11, EREG 15}. When defining an EREG group having 8 EREGs, the EREG groups may be defined as EREG group #0={EREG 0, EREG 2, EREG 4, EREG 6, EREG 8, EREG 10, EREG 12, EREG 14}, and EREG group #1={EREG 1, EREG 3, EREG 5, EREG 7, EREG 9, EREG 11, EREG 13, EREG 15}.

As described above, an ECCE includes 4 EREGs, and, in an extended CP, an ECCE may include 8 EREGs. An ECCE is defined by an EREG group. For example, FIG. 6 shows an example wherein ECCE #0 includes EREG group #0, wherein ECCE #1 includes EREG group #1, wherein ECCE #2 includes EREG group #2, and wherein ECCE #3 includes EREG group #3.

In ECCE-to-EREG mapping, there are two types: localized transmission and distributed transmission. In the localized transmission, an EREG group configuring one ECCE is selected from an EREG within a PRB pair. In the distributed transmission, an EREG group configuring one ECCE is selected from EREGs of different PRB pairs.

Figure 11:
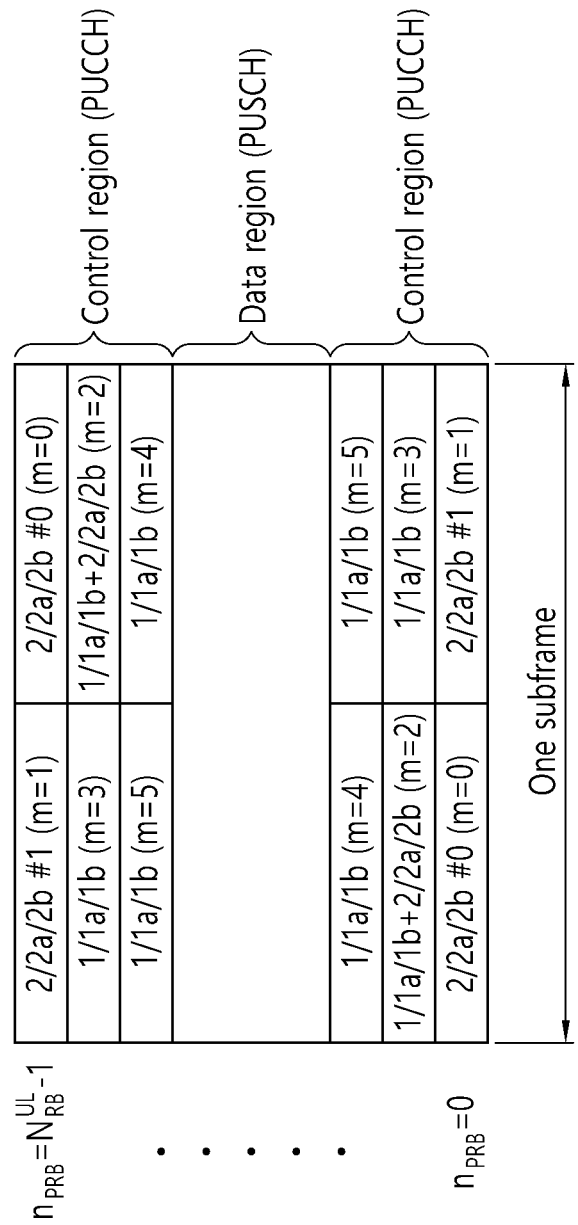
FIG. 11 illustrates a PUCCH and a PUSCH within an uplink subframe.

FIG. 11 Illustrates a PUCCH and a PUSCH within an Uplink Subframe.

Uplink control information (UCI) may be transmitted over the PUCCH. At this point, the PUCCH carries diverse types of control information. The UCI includes HARQ ACK/NACK, SR (Scheduling Request), and channel status information (CSI), which indicates the state of the downlink channel.

PUCCH Format 1 carries a SR (Scheduling Request). At this point, an OOK (On-Off Keying) method may be applied. PUCCH Format 1a carries an ACK/NACK(Acknowledgement/Non-Acknowledgement), which is modulated by using a BPSK (Binary Phase Shift Keying) scheme with respect to one codeword. PUCCH Format 1b carries an ACK/NACK, which is modulated by using QPSK (Quadrature Phase Shift Keying) scheme with respect to two codewords. PUCCH Format 2 carries a CQI (Channel Quality Indicator), which is modulated by using the QPSK scheme. PUCCH Formats 2a and 2b carry CQI and ACK/NACK.

Table 5 shows a PUCCH format.

TABLE 5

| Format | Description |
| --- | --- |
| Format 1 | Scheduling Request (SR) |
| Format 1a | ACK/NACK of a 1-bit HARQ, Scheduling Request (SR) may exist or may not exist |
| Format 1b | ACK/NACK of a 2-bit HARQ, Scheduling Request (SR) may exist or may not exist |
| Format 2 | CSI (20 code bits) |
| Format 2 | In case of an extended CP, CSI and 1-bit or 2-bit HARQ ACK/NACK |
| Format 2a | CSI and 1-bit HARQ ACK/NACK |
| Format 2b | CSI and 2-bit HARQ ACK/NACK |
| Format 3 | Multiple ACK/NACKs for carrier aggregation |

Each PUCCH Format is mapped to the PUCCH region and then transmitted accordingly. For example, PUCCH Format 2/2a/2b is mapped to a resource block (m=0, 1 in FIG. 8) located at an edge portion of the band that is allocated to the user equipment and then transmitted accordingly. A mixed PUCCH RB may be mapped to a neighboring resource block (e.g., m=2), which is adjacent to the resource block to which the PUCCH Format 2/2a/2b are allocated toward the center of the band, and transmitted accordingly. The PUCCH Format 1/1a/1b through which the SR and ACK/NACK are transmitted may be positioned to the resource block corresponding to m=4 or m=5. The number of resource blocks (N(2)RB), which may be used in the PUCCH Format 2/2a/2b through which the CQI is transmitted, may be indicated to the user equipment through a signal that is being broadcasted. The PUCCH Format 3 is used for carrying a 48-bit encoded UCI. The PUCCH Format 3 may carry HARQ ACK/NACK respective to multiple serving cells and a CSI report respective to one serving cell. The PUCCH Format 3 performs transmission based on block spreading. More specifically, the PUCCH Format 3 spreads (or disperses) a modulation symbol sequence, wherein a multiple-bit ACK/NACK is modulated, in the time domain by using a block spreading code and then transmits the spread sequence.

The above-described CSI refers to an indicator indicating the state of the DL channel, and the CSI may include at least one of a CQI (Channel Quality Indicator) and a PMI (Precoding Matrix Indicator). Additionally, a PTI (precoding type indicator), a RI (rank indication), and so on, may also be included.

The CQI provides information on a link adaptive parameter that can be supported by the user equipment with respect to a given time. The CQI may designate a data rate, which can be supported by a downlink channel, based on the characteristics and SINR (signal to interference plus noise ratio) of a user equipment receiver. The base station may decide a modulation (QPSK, 16-QAM, 64-QAM, and so on) and a coding rate that are to be applied to the downlink channel by using the CQI. The CQI may be generated by using diverse methods. For example, there is a method of performing feedback by quantizing the channel state without any modification, a method of performing feedback by calculating the SINR (signal to interference plus noise ratio), a method of notifying a state that is actually being applied to the channel, such as a MCS (Modulation Coding Scheme), and so on. In case the CQI is generated based on the MCS, the MCS includes the modulation scheme, the coding method, and the respective coding rate, and so on.

The PMI provides information on a precoding matrix during the precoding of a codebook base. The PMI is associated with MIMO (multiple input multiple output). The PMI being fed-back in MIMO is referred to as closed loop MIMO.

The RI corresponds to information on a number of layers recommended by the user equipment. More specifically, the RI indicates a number of independent streams that are used for spatial multiplexing. The RI is fed-back only in a case when the user equipment is operated in the MIMO mode using spatial multiplexing. The RI is always associated with one or more CQI feedback. More specifically, the CQI that is being fed-back is calculated by assuming a specific RI value. Since the rank of a channel generally varies at a slower rate as compared to the CQI, the RI is fed-back for a number of times that is slower than the CQI. The transmission cycle period (or period) of the RI may be the multiple of the CQI/PMI transmission period. The RI is given with respect to the entire system band, and a frequency selective RI feedback is not supported.

As described above, the PUCCH is only used for the transmission of the UCI. For this, the PUCCH supports multiple Formats. Depending on the modulation scheme that belongs to the PUCCH Format, a PUCCH having different number of bits for each subframe may be used.

Meanwhile, the PUSCH that is shown in the drawing is mapped to a UL-SCH (Uplink Shared Channel), which is the transport channel. Uplink data that are transmitted over the PUSCH may correspond to a transport block, which is a data block for the UL-SCH that is being transmitted during a TTI. The transport block may include user data. Alternatively, the uplink data may correspond to multiplexed data. The multiplexed data may correspond to data having a transport block and channel state information of a UL-SCH (uplink shared channel) multiplexed therein. For example, the channel state information (CSI) that is being multiplexed in the data may include CQI, PMI, RI, and so on. Alternatively, the uplink data may only be configured of the channel state information. Periodic or aperiodic channel state information may be transmitted through the PUSCH.

The PUSCH is allocated by a UL grant within the PDCCH. Although it is not shown in the drawing, a $4^{th}$ symbol of each slot in a normal CP is used for the transmission of a DM RS (Demodulation Reference Signal) for the PUSCH.

Meanwhile, the PUCCH transmission control power will hereinafter be described.

<PUCCH Transmission Control Power>.

LTE-A uses the following power control method for an efficient transmission of the PUCCH.

If serving cell c is a primary cell, a transmit power $P_{PUCCH}$ for the PUCCH transmission in subframe i is defined as shown in the following equation.

$$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\} [dBm] \quad \text{Equation 4}$$

If the user equipment does not transmit the PUCCH from the primary cell, in order to accumulate the TPC command received in the DCI Format 3/3A, the user equipment assumes the transmit power $P_{PUCCH}$ for the PUCCH transmission in subframe i as shown below in the following equation.

$$P_{PUCCH}(i) = \min\{P_{CMAX,c}(i), P_{0\_PUCCH} + PL_c + g(i)\} \quad [dBm] \quad \text{Equation 5}$$

In this equation, $P_{CMAX,c}(i)$ represents a transmit power of the user equipment, which is configured for the serving cell c in subframe i.

$\Delta_{F\_PUCCH}(F)$ is a parameter that is given as a higher layer signal. Each $\Delta_{F\_PUCCH}(F)$ value corresponds to a value given relatively with respect to PUCCH Format (F) based on PUCCH Format 1a. F may correspond to 1, 1a, 1b, 2, 2a, 2b, or 3.

If the user equipment is configured by a higher layer to transmit the PUCCH through two antenna ports, the value of $\Delta_{TxD}(F')$ is given by the higher layer, and, if not, $\Delta_{TxD}(F')=0$.

$h(n_{CQI}, n_{HARQ}, n_{SR})$ corresponds to a value that belongs to the PUCCH Format, and $n_{CQI}$ corresponds to the number of information bits included in the CQI. If subframe i is configured for the SR of a user equipment that does not have a single transport block for the UL-SCH, $n_{SR}$ is equal to 1, and, if not, $n_{SR}$ is equal to 0. If one serving cell is configured to the user equipment, $n_{HARQ}$ signifies a number of A/N bits being transmitted from subframe and, if not, $n_{HARQ}$ is as defined in Section 10.1 of "3GPP TS 36.213 V10, Evolved Universal Terrestrial Radio Access (E-UTRA); Physical layer procedures (Release 10)".

More specifically, in FDD, in case two serving cells are configured to the user equipment and PUCCH Format 1b channel selection is configured, or in case two serving cells are configured to the user equipment and PUCCH Format 3 is configured, $n_{HARQ}$ is determined as shown below in the following equation.

$$n_{HARQ} = \sum_{c=0}^{N_{cells}^{DL}-1} N_c^{received} \qquad \text{Equation 6}$$

In this equation, $N^{DL}_{cells}$ represents a number of configured cells, and $N^{received}_c$ signifies a number of transport blocks that are received in subframe n−4 of serving cell c or a number of SPS-released PDCCHs.

In TDD, 1) in case two serving cells are configured for the user equipment, and in case the selection of a PUCCH Format 1b channel is configured and a subframe n, wherein M=1 is used, or 2) in case UL-DL configuration 0 is configured for the user equipment, and in case PUCCH Format 3 is configured, $n_{HARQ}$ is determined as shown below in the following equation.

$$n_{HARQ} = \sum_{c=0}^{N_{cells}^{DL}-1} \sum_{k \in K} N_{k,c}^{received} \qquad \text{Equation 7}$$

In this equation, $N^{received}_{k,c}$ signifies a number of transport blocks that are received in subframe n−4 of serving cell c or a number of SPS-released PDCCHs. k∈K, and K is defined in Table 10.1.3.1-1 of 3GPP TS 36.213. V10, Evolved Universal Terrestrial Radio Access (E-UTRA); physical layer procedures (Release 10), which corresponds to a set configured of M number of elements, i.e., $\{k_0, k_1, \ldots, k_{M-1}\}$ (hereinafter, the same).

In case PUCCH Format 3 is configured with respect to TDD UL-DL Configurations 1-6, or, in TDD, in case 2 serving cells are configured and a PUCCH Format 1b channel selection is configured and M=2, $n_{HARQ}$ is determined as shown below in the following equation.

$$n_{HARQ} = \qquad \text{Equation 8}$$
$$\sum_{c=0}^{N_{cells}^{DL}-1} \left( ((V_{DAI,c}^{DL} - U_{DAI,c}) \bmod 4) \cdot n_c^{ACK} + \sum_{k \in K} N_{k,c}^{received} \right)$$

In this equation, $V^{DL}_{DAI,c}$ corresponds to $V^{DL}_{DAI}$ in serving cell c. $U_{DAI,c}$ corresponds to $U_{DAI}$ in serving cell c. $n^{ACK}_c$ represents a number of HARQ-ACK bits corresponding to the downlink transmission mode that is configured in serving cell c. In case spatial HARQ-ACK bundling is applied in serving cell c, $n^{ACK}_c=1$, and $N^{received}_{k,c}$ signifies a number of PDSCHs that are received without any corresponding PDCCH in subframe n-k of serving cell c or a number of PDCCHs.

In case spatial HARQ-ACK bundling is not applied in serving cell c, $N^{received}_{k,c}$ signifies a number of transport blocks that are received in subframe n-k of serving cell c or a number of SPS-released PDCCHs.

If the transport block or SPS-released PDCCH is not detected in subframe n-k, then, $V^{DL}_{DAI,c}$ is equal to 0.

In a TDD having two serving cells configured therein, in case a PUCCH Format 1b channel selection is configured, and, in case M=3 or 4, when the user equipment receives a PDSCH or a PDCCH directing the release of downlink SPS (SPS-released PDCCH), $n_{HARQ}$ is equal to 2, and, if not, $n_{HARQ}$ is equal to 4.

With respect to PUCCH Format 1, 1a, and 1b, $h(n_{CQI}, n_{HARQ}, n_{SR})=0$.

With respect to the PUCCH Format 1b channel selection, if two or more serving cells are configured to the user equipment, $h(n_{CQI}, n_{HARQ}, n_{SR})=(n_{HARQ}-1)/2$, and, if not, $h(n_{CQI}, n_{HARQ}, n_{SR})=0$.

In case of PUCCH Format 2, 2a, and 2b, and in case of a normal CP, $h(n_{CQI}, n_{HARQ}, n_{SR})$ is as shown below in the following equation.

$$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases} \qquad \text{Equation 9}$$

In case of PUCCH Format 2, 2a, and 2b, and in case of an extended CP, $h(n_{CQI}, n_{HARQ}, n_{SR})$ is as shown below in the following equation.

$$h(n_{CQI}, n_{HARQ}, n_{SR}) = \qquad \text{Equation 10}$$
$$\begin{cases} 10\log_{10}\left(\frac{n_{CQI}+n_{HARQ}}{4}\right) & \text{if } n_{CQI}+n_{HARQ} \geq 4 \\ 0 & \text{otherwise} \end{cases}$$

With respect to PUCCH Format 3, when the user equipment is configured to transmit a PUCCH through two antenna ports by a higher layer, or when the user equipment transmits HARQ-ACK/SR that is larger than 11 bits, $h(n_{CQI}, n_{HARQ}, n_{SR})$ is as shown below in the following equation.

$$h(n_{CQI}, n_{HARQ}, n_{SR}) = \frac{n_{HARQ}+n_{SR}-1}{3} \qquad \text{Equation 11}$$

If not, $h(n_{CQI}, n_{HARQ}, n_{SR})$ is as shown below in the following equation.

$$h(n_{CQI}, n_{HARQ}, n_{SR}) = \frac{n_{HARQ}+n_{SR}-1}{2} \qquad \text{Equation 12}$$

$P_{O\_PUCCH}$ represents a parameter that is configured of a sum of a $P_{O\_NOMINAL\_PUCCH}$ parameter, which is provided by a higher layer, and $P_{O\_UE\_PUCCH}$.

$\delta_{pucch}$ corresponds to a UE-specific correction value and is associated with a TPC command, which is joint-coded with another UE-specific PUCCH correction value and transmitted from a PDCCH including DCI Format 1A/1B/1D/1/2A/2/2B/2C respective to the primary cell or a PDCCH including DCI Format 3/3A, wherein CRC parity bits are scrambled by a TPC-PUCCH-RNTI.

The user equipment (UE) attempts to perform decoding of a PDCCH having DCI Format 3/3A by using the TPC-PUCCH-RNTI in all subframes excluding DRX, and the user equipment also attempts to perform decoding of one PDCCH or multiple PDCCHs having DCI Format 1A/1B/1D/1/2A/2/2B/2C by using a C-RNTI or SPS C-RNTI.

If the UE decodes the PDCCH including DCI Format 1A/1B/1D/1/2A/2/2B/2C respective to the primary cell, and, if the corresponding detected RNTI is identical to the C-RNTI or SPS C-RNTI of the UE, and, if a TPC field including in the DCI Format is not used for deciding the PUCCH resource, the UE uses $\delta_{pucch}$, which is provided by the PDCCH.

Alternatively, if the UE decodes a PDCCH including DCI Format 3/3A, the UE uses $\delta_{pucch}$, which is provided by the PDCCH, and, if not, $\delta_{pucch}$ is set to 0 dB.

g(i) signifies a current PUCCH power control adjustment state, and g(0) corresponds to a first value after reset. g(i) may be represented as shown below in the following equation.

$$g(i) = g(i-1) + \sum_{m=0}^{M-1} \delta_{PUCCH}(i-k_m) \quad \text{Equation 13}$$

In FDD, M=1, and $k_0$=4.

In TDD, M represents a number of DL subframes corresponding to one UL subframe, the value of $k_m$ represents a subframe respective to the corresponding UL subframe, i.e., subframe n-$k_m$.

A $\delta_{pucch}$ value that is being signaled through the PDCCH having DCI Format 1A/1B/1D/1/2A/2/2B/2C is given as shown below in the following table.

TABLE 6

| TPC Command Field in DCI format A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

If the PDCCH including DCI Format 1/1A/2/2A/2B/2C is validated as a SPS-activated PDCCH, or if a PDCCH having DCI Format 1A is validated as a SPS-activated PDCCH, $\delta_{pucch}$ is equal to 0 dB.

The $\delta_{pucch}$ value that is being signaled through the PDCCH having DCI Format 3/3A is given as shown above in Table 6 or as shown below in Table 7. Whether Table 6 or Table 7 is to be used is semi-statically configured by a higher layer.

TABLE 7

| TPC Command Field in DCI format 3A | $\delta_{PUCCH}$ [dB] |
|---|---|
| 0 | −1 |
| 1 | 1 |

If the $P_{O\_UE\_PUCCH}$ value is changed by a higher layer, g(0)=0, and, if not, the value is given as shown below in the following equation.

$$g(0)=\Delta P_{rampup}+\delta_{msg2} \quad \text{Equation 14}$$

In the equation, $\delta_{msg2}$ represents a TPC command that is directed by the random access response, and $\Delta P_{rampup}$ represents a total increase in power starting from the first preamble to the last preamble, which are provided by the higher layer.

If the UE reaches $P_{CMAX,c}(i)$ with respect to the primary cell, positive TPC commands respective to the primary cell are not accumulated.

If the UE reaches the minimum power, negative TPC commands are not accumulated.

1) When the PO_UE_PUCCH value is changed by the higher layer, and 2) when a Random Access Response message is received, the UE resets the accumulation.

If subframe i is not an uplink subframe in TDD, then, g(i)=g(i−1).

Hereinafter, a general random access method will be described. Random access is used to allow the UE to acquire uplink synchronization with the base station or to be allocated with uplink radio resource. Random access may be divided into contention based random access and non-contention based random access.

Figure 12A:
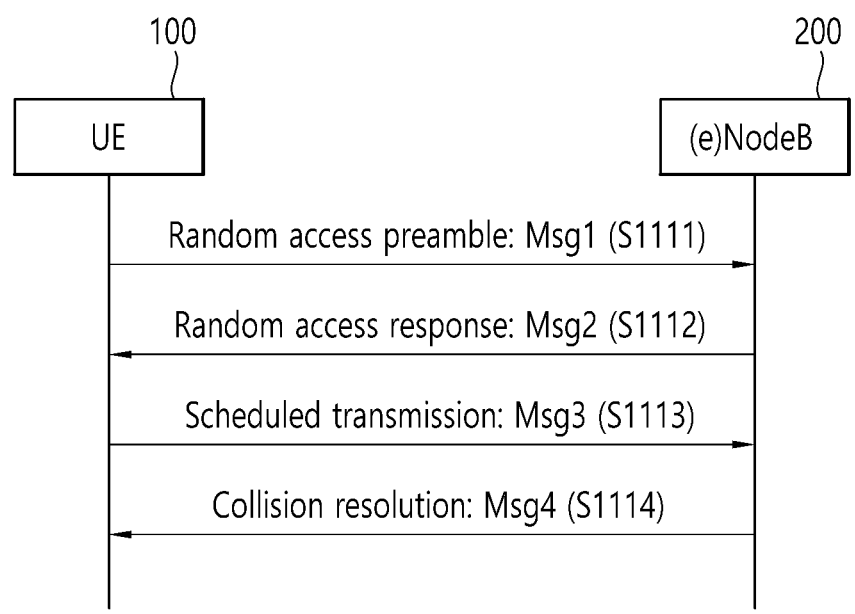
FIG. 12a illustrates drawing showing a contention based random access method.

FIG. 12a Illustrates Drawing Showing a Contention Based Random Access Method.

Referring to FIG. 12a, the UE 100 randomly selects one random access preamble from a set of random access preambles that are designated through the system information or handover command. And, by selecting a radio resource that can transmit the random access preamble, the UE 100 transmits the selected random access preamble (Message 1: Msg 1) (S1111). The radio resource may correspond to a specific subframe, and this may be a subframe that selects a PRACH (Physical Random Access Channel).

After transmitting the random access preamble, the UE 100 attempts to receive a Random Access Response (RAR) within a RAR receiving window (RAR window), which is designated through the system information or handover command, and, accordingly, the UE 100 receives a Random Access Response (RAR) (Message 2: Msg2) (S1112). The Random Access Response (RAR) may be transmitted in a MAC PDU (Protocol data unit) Format.

A Random Access Preamble identifier (ID), a UL Grant (uplink radio resource), a temporary C-RNTI (Temporary Cell-Radio Network Temporary Identifier), and a synchronization correction command (e.g., Timing Advance Command (TAC)) may be included in the Random Access Response (RAR). And, since random access response information for one or more UEs 100 may be included in one Random Access Response (RAR), a random access preamble identifier may be included in order to notify to which UE 100 the included UL Grant, temporary C-RNTI, and synchronization correction command (e.g., Timing Advance Command (TAC)) are valid. The random access preamble identifier may correspond to an identifier respective to the random access preamble received by the base station (eNodeB) 200. The synchronization correction command (e.g., Timing Advance Command (TAC)) may be included as information for allowing the UE 100 to adjust the uplink synchronization. The random access response may be directed by a random access identifier within the PDCCH, i.e., RA-RNTI (Random Access-Radio Network Temporary Identifier).

When the UE receives a Random Access Response (RAR) that is valid to the UE itself, the UE 100 processes the information included in the Random Access Response (RAR), and, then, the UE 100 performs a scheduled transmission (Message 3: Msg 3) to the base station (eNodeB) 200 (S1113). More specifically, the UE 100 applies a synchronization correction command (e.g., Timing Advance Command: TAC) and stores a temporary C-RNTI. Additionally, by using a UL Grant, the UE 100 transmits data stored in the buffer of the UE 100 or newly generated data to the base station (eNodeB) 200. In this case, information that can identify the UE 100 should be included. This is because, during a contention based random access procedure, since it is difficult for the base station (eNodeB) 200 to determine which UEs 100 perform random access, the corresponding UE 100 is required to be identified in order to resolve collision.

After the UE 100 transmits the scheduled message (i.e., MSG3) including its own identifier through a radio resource, which is allocated by the UL Grant being included in the random access response (RAR), the UE 100 waits for an indication (Message 4: Msg 4) from the base station (eNodeB) 200 in order to resolve collision (S1114). More specifically, the reception of PDCCH is attempted in order to receive a specific message.

Figure 12B:
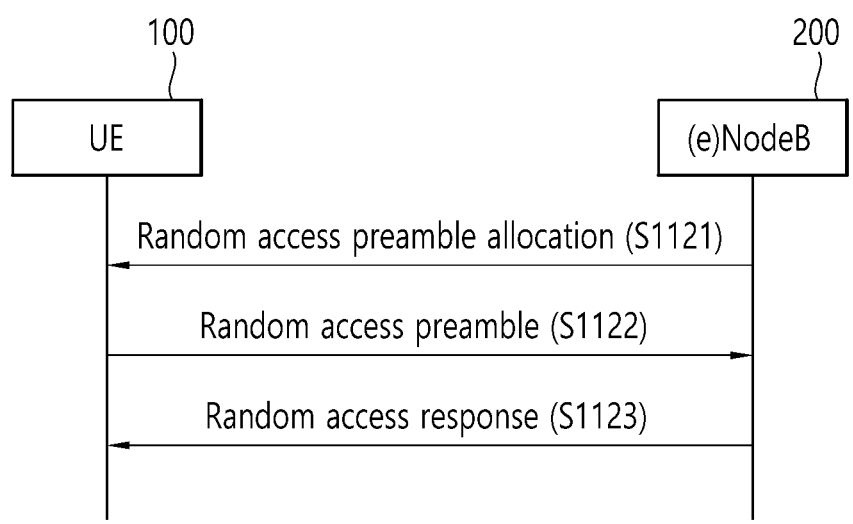
FIG. 12b illustrates drawing showing a non-contention based random access method.

FIG. 12*b* Illustrates Drawing Showing a Non-Contention Based Random Access Method.

Unlike the contention based random access, the non-contention based random access may be ended by having the UE 100 receive the random access response.

The non-contention based random access may be initiated by a request, such as a handover and/or a command of the base station (eNodeB) 200. However, in the two cases that are described above, the contention based random access may also be performed.

The UE 100 is allocated with a designated random access preamble that has no likelihood of collision from the base station (eNodeB) 200. The allocation of the random access preamble may be performed through a handover command and a PDCCH command (S1121).

After the UE 100 is allocated with a random access preamble that is designated for the UE 100 itself, the UE 100 transmits the corresponding random access preamble to the base station (eNodeB) 200 (S1122).

When the base station (eNodeB) 200 receives the random access preamble, the base station (eNodeB) 200 transmits a Random Access Response (RAR) as a response to such reception (S1123).

Meanwhile, the MTC will hereinafter be described.

Figure 13A:
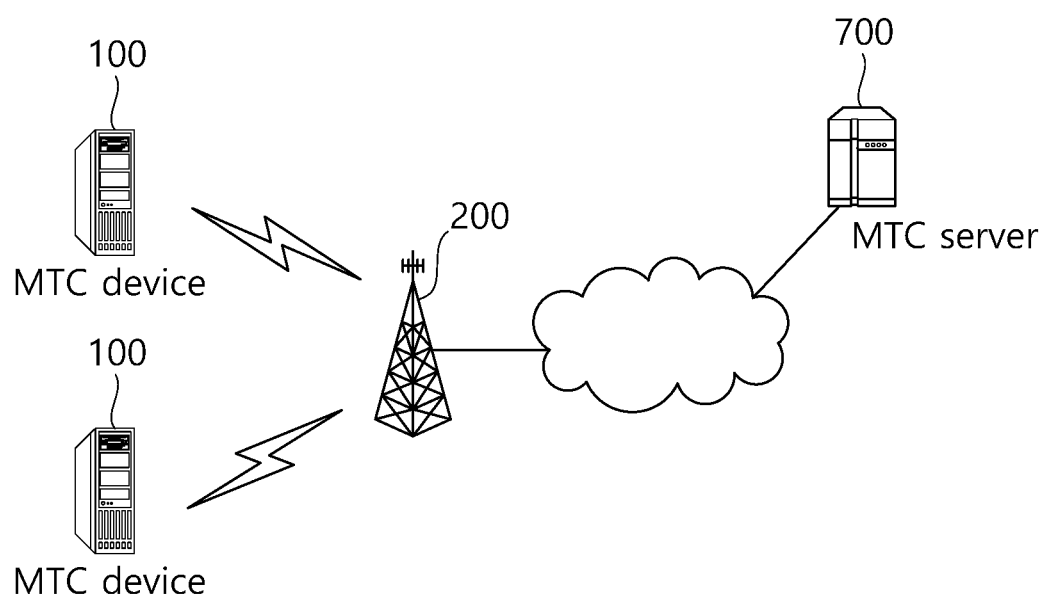
FIG. 13a illustrates an exemplary of MTC (Machine Type communication).

FIG. 13*a* Illustrates an Exemplary of MTC (Machine Type Communication).

MTC (Machine Type Communication) refers to an information exchange between MTC device 100 that do not involve human interaction through the base station 200 or an information exchange between an MTC device 100 and an MTC server 700 through the base station.

The MTC service 700 refers to an entity that communicates with an MTC device 100. The MTC server 700 executes an MTC application and provides an MTC-specific service to the MTC device 100.

As a wireless device providing MTC, the MTC device 100 may be fixed or have mobility.

Services provided through MTC are differentiated from the existing communication services that involve human intervention, and an extended range of MTC services is provided, such as tracking, metering, payment, medical services, remote controlled services, and so on. More specifically, examples of MTC services may include reading meters, measuring water levels, using surveillance cameras, making inventory reports for vending machines, and so on.

One of the characteristics of the MTC device is that is has a small transmission data amount and that uplink/downlink data transmission/reception occurs occasionally. And, therefore, it will be effective to decrease a unit cost of the MTC device and to reduce battery consumption in accordance with the low data transmission rate. Another characteristic of the MTC device is that it has low mobility, and, accordingly, its channel environment hardly changes.

Figure 13B:
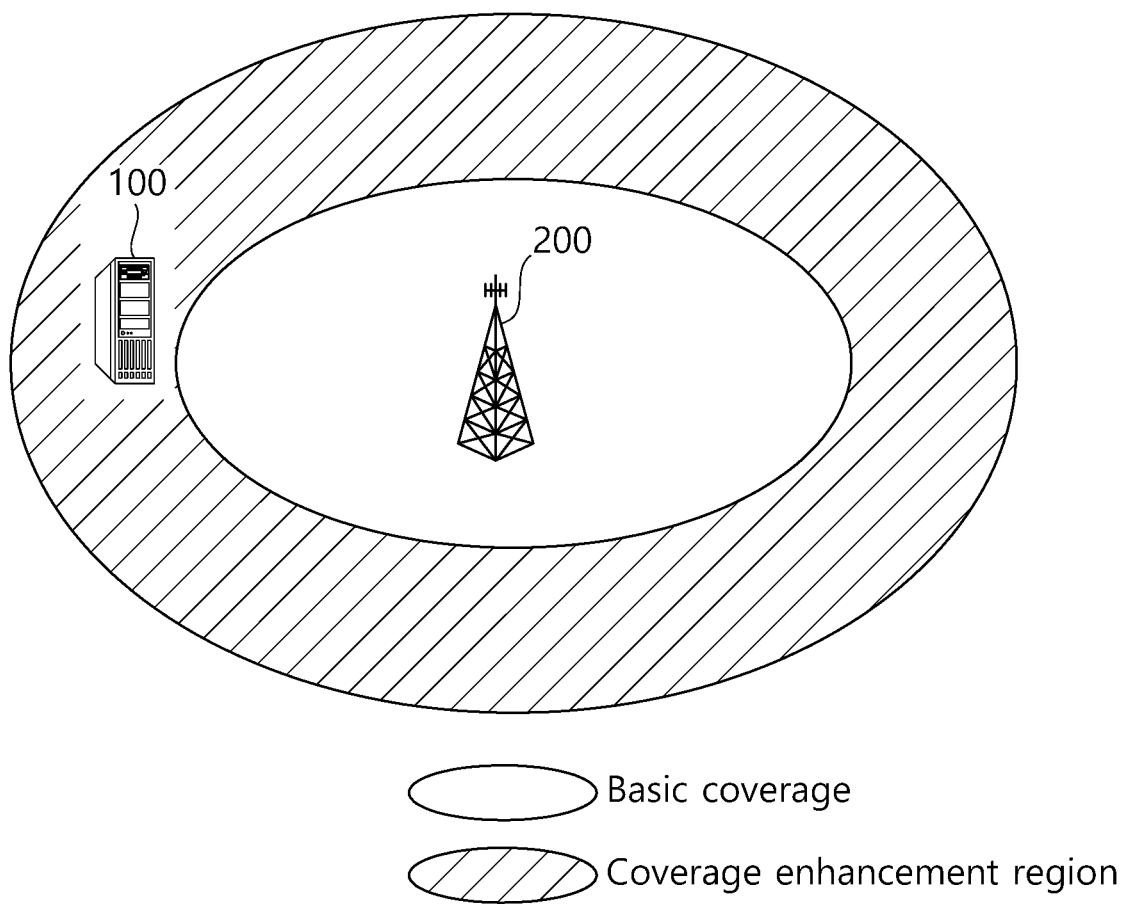
FIG. 13b illustrates an example of cell coverage enhancement for MTC devices.

FIG. 13*b* Illustrates an Example of Cell Coverage Enhancement for MTC Devices.

Recently, enhancing the cell coverage of the base station for MTC device 100 has been considered, and diverse methods for cell coverage enhancement are being discussed.

However, in case the coverage of a cell is enhanced, if the base station transmits PDSCH and (E)PDCCH including scheduling information respective to the PDSCH to an MTC device that is located in the coverage enhancement region, just as when the base station performs transmission to general UEs, the MTC device may have difficulty in receiving the channels.

Herein, (E)PDCCH signifies a PDCCH or EPDCCH (E-PDCCH).

More specifically, in case of a MTC device (or MTC user equipment), since the transmission size is small, and since uplink/downlink data transmission/reception occurs occasionally, it will be efficient to lower the price of the user equipment and to reduce battery consumption in accordance with such low data transmission rate.

One of the characteristics of such MTC device is that it has low mobility, and, accordingly, another one of its characteristics is that its channel environment does not change. In the current LTE-A, it is being considered to provide such MTC devices with wider coverage as compared to the legacy MTC device, and, in order to do so, extensive discussions are being carried out on diverse coverage enhancement methods for MTC devices.

In case the user equipment (UE) performs initial access to a specific cell, the UE receives MID (master information block) and SIB (system information block) information and RRC (radio resource control) parameters respective to the corresponding cell from the base station (eNodeB), which manages/controls the corresponding cell.

At this point, there lies a problem in that the MTC device should have a wider coverage as compared to the legacy UE. Therefore, if the base station (eNodeB) transmits a SIB just as when transmitting it to the legacy UE, the MTC device may have difficulty in receiving the transmitted SIB. In order to resolve this, in case the base station (eNodeB) transmits a SIB of a MTC device having a coverage issue through the PDSCH, the base station (eNodeB) may perform transmission by applying methods for coverage enhancement, such as subframe repetition, subframe bundling, and so on.

Additionally, in case the base station (eNodeB) transmits the PDCCH and PDSCH to the MTC devices, when the base station performs transmission by using the same transmission method as when performing transmission to the legacy UE, a MTC device having coverage issues may have difficulty in receiving the PDCCH and PDSCH. In order to resolve this problem, in case the base station (eNodeB) transmits the PDCCH or PDSCH to a MTC device having coverage issues, the base station (eNodeB) may perform transmission by applying methods for coverage enhancement, such as subframe repetition, subframe bundling, and so on. Similarly, even in case the UE (or MTC device) transmits the PUCCH and PUSCH to the base station, in order to enhance the coverage, the UE (or MTC device) may use a method of performing repetitive (or repeated) transmission through multiple frames.

In case a MTC device having coverage issues and a legacy UE or a MTC device that does not have any coverage issues are serviced by the same cell, there lies a problem in that a large amount of resource is used in order to transmit data to the MTC device having coverage issues, thereby causing limitations in services that are to be provided to other user equipments. Accordingly, in order to prevent the MTC device having coverage issues from causing any damage (or harm) to other UEs, a TDM (Time division multiplexing) method may be used, wherein the time domain for providing services is divided for the UE having coverage issues and the UE that does not have any coverage issue. The TDM method may be carried out at long-term intervals consisting of units of several tens of minutes, and the TDM method may also be carried out at short-term intervals consisting of subframe units.

<Disclosures of this Specification>

Therefore, an object of the disclosures of this specification is to propose a solution for resolving the above-described problems.

In order to resolve the above-described problems, in case the base station transmits a PDSCH, PDCCH, or EPDCCH (Enhanced PDCCH) to a MTC device 100, which is located in a coverage enhancement region, the disclosures of this specification allow the transmission to be repeatedly carried out over multiple subframes (e.g., bundled subframes).

Additionally, in case a MTC device 100, which is located in a coverage enhancement region, transmits a PUCCH or PUSCH to the base station, the disclosures of this specification allow the transmission to be repeatedly carried out over multiple subframes (e.g., bundled subframes).

For example, by having the MTC device receive a bundle of (E)PDCCHs through multiple subframes and decode the bundle of (E)PDCCHs, the decoding success rate may be enhanced.

More specifically, the (E)PDCCH may be successfully decoded by using part or all of the bundle of (E)PDCCHs being received through multiple subframes. In other words, the by having the MTC device combine a bundle of (E)PD-CCHs having the same (E)PDCCH repeated therein and decode the bundle of (E)PDCCHs, the decoding success rate may be enhanced.

Similarly, by having the MTC device receive a bundle of PDSCHs through multiple subframes and decode part or all of the bundle of PDSCHs, the decoding success rate may be enhanced. Similarly, a MTC device that is located in the coverage enhancement region may transmit a bundle of PUCCHs through multiple subframes. And, the MTC device may transmit a bundle of PUSCHs through multiple subframes.

Figure 14A:
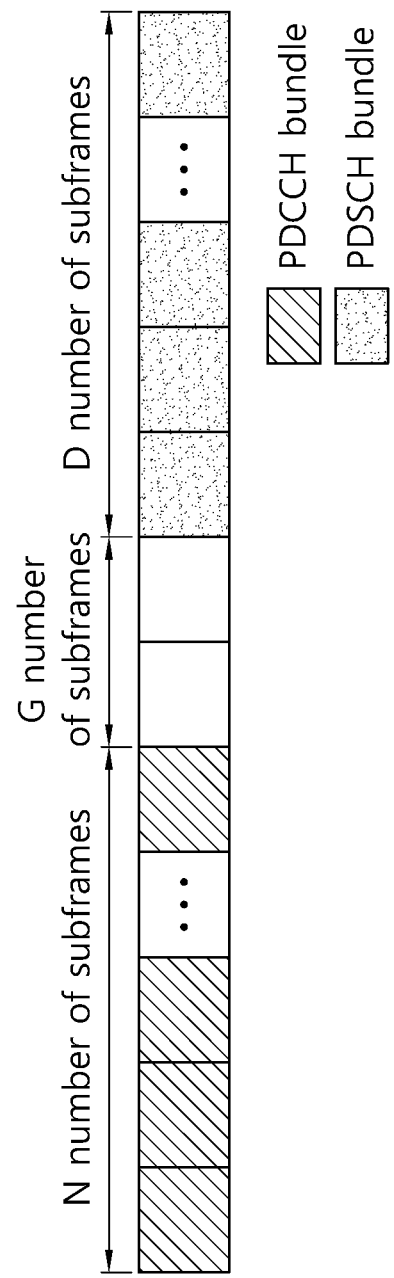
FIG. 14a and FIG. 14b illustrate exemplary diagrams respectively showing examples of a bundle of (E)PDCCHs and a bundle of PDSCHs being transmitted.
Figure 14B:
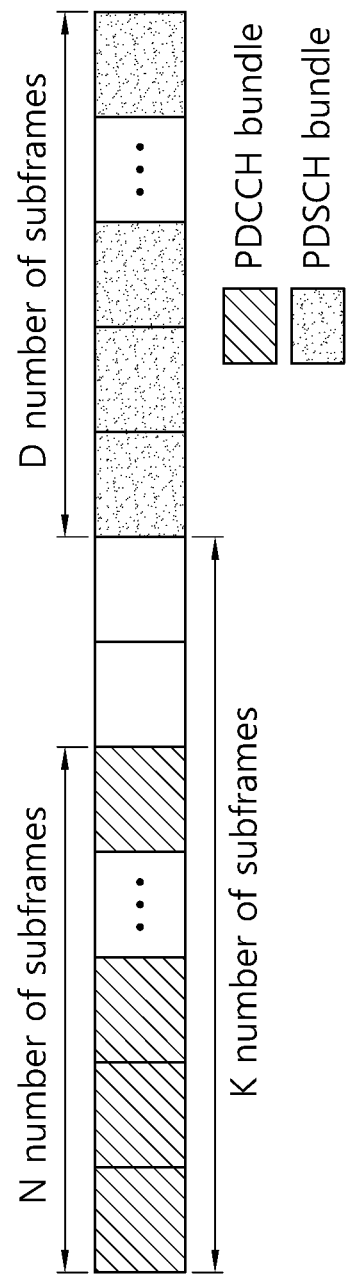

FIG. 14a and FIG. 14b Illustrate Exemplary Diagrams Respectively Showing Examples of a Bundle of (E)PD-CCHs and a Bundle of PDSCHs Being Transmitted.

Referring to FIG. 14a, the base station may transmit a bundle of (E)PDCCHs having the same (E)PDCCH repeated therein over multiple (e.g., N number of) subframes for a MTC device that is located in a coverage enhancement region. Additionally, the base station may transmit a bundle of PDSCHs having the same PDSCH repeated therein over multiple (e.g., D number of) subframes for a MTC device that is located in a coverage enhancement region. At this point, the bundle of PDSCHs may be transmitted after the transmission of the bundle of PDCCHs is completed and after a predetermined gap, e.g., after G number of subframes.

More specifically, for example, in case the transmission of the bundle of PDCCHs is completed over Subframe (N−1), the bundle of PDSCHs may be transmitted over D number of subframes starting from Subframe (N+G). At this point, as an example, the value of N and the value of D may always be configured to have the same value. Additionally, for example, the value of G and the value of D may also be given the same value. Alternatively, the value of G may correspond to a value that can be known in advance by the UE. For example, the UE may know the value of G through a MIB (master information block) or SIB (System Information Block)

Additionally, the D value may be set up differently or designated differently in accordance with the level of coverage enhancement. Moreover, the D value may also be designated differently in accordance with each (E)PDCCH aggregation level. For example, the G value may be set up based on the difference in the number of repetition with respect to each aggregation level.

Meanwhile, after receiving the bundle of (E)PDCCHs, the MTC device may know that the reception of the bundle of PDSCHs begins after G number of subframes.

Meanwhile, referring to FIG. 14b, the base station may transmit the bundle of (E)PDCCHs during a period of N number of subframes for the MTC device that is located in the coverage enhancement region, and, then, after a predetermined period of time, the base station may transmit the bundle of PDSCHs during a period of D number of subframes.

Alternatively, the base station may transmit the bundle of (E)PDCCHs during a period of N number of subframes for the MTC device that is located in the coverage enhancement region, and, then, the base station may transmit the bundle of PDSCHs during a period of D number of subframes after Subframe K after the beginning of the bundle of PDCCHs.

More specifically, a difference between a position of the subframe where the bundle of (E)PDCCHs begins and a position of the subframe where the bundle of PDSCHs begins may be referred to as Subframe K (e.g., K=100, 200).

In this case, the MTC device should know from which subframe the bundle of (E)PDCCHs begins.

For example, in case K=Index of PDSCH bundle transmission start subframe—Index of (E)PDCCH bundle transmission start subframe is defined, the MTC device may successfully know the starting point from which the PDSCH bundle transmission begins only after knowing the starting point from which the PDCCH bundle transmission begins.

In this case, it is advantageous in that, even if the MTC device does not know the number of subframes through which the (E)PDCCH bundle is being transmitted, the MTC device is capable of knowing the location of the subframe from which the transmission of the PDSCH bundle begins.

It may be assumed that the value is K is always set to have a fixed value. Alternatively, the value of K may be given a value that can be known by the MTC device, or the value of K may correspond to a value that can be known through a MIB or SIB. Additionally, the value of K may be set of differently in accordance with the level of coverage enhancement. The K value may also be designated differently in accordance with each (E)PDCCH aggregation level. For example, the K value may be set up based on the difference in the number of repetition with respect to each aggregation level.

As described above, the position of a subframe from which the transmission of the (E)PDCCH bundle begins is not determined as freely as the conventional method, and, instead, the transmission of the (E)PDCCH bundle may begin only from a predetermined (or pre-arranged) subframe position. The position of such (E)PDCCH bundle transmission start subframe may be defined to be given a fixed value. And, such fixed value may be notified to the MTC device through system information, e.g., MIB (Master Information Block) or SIB. For example, in case it is assumed that the transmission of the (E)PDCCH bundle begins only from SFN (System Frame Number) % N=0 (e.g., N=20), the N value may be notified to the MTC device through the MIB. Moreover, in case it is assumed that the transmission of the (E)PDCCH bundle begins only from offset (SFN % N=offset), the N value may be notified to the MTC device through the MIB. For example, the (E)PDCCH transmission for the MTC device that is located in the coverage enhancement region may begin only from a subframe or SFN position corresponding to a multiple of 100 ($0^{th}$, $100^{th}$, $200^{th}$, $300^{th}$, . . . ).

At this point, the MTC device may attempt to perform (E)PDCCH reception through N number of subframes starting from the subframe or SFN position corresponding to a multiple of 100.

Meanwhile, the subframe position from which the transmission of the PDCCH bundle can be started may vary for each MTC device. More specifically, the position of the subframe from which the transmission of the PDCCH bundle can be started may be UE-specifically determined.

In this case, information of the subframe position from which the transmission of the PDCCH bundle can be started may be notified (or set up) to the MTC device via higher layer signaling, such as RRC.

Each of the subframes through which PDCCH/EPDCCH/PDSCH/PUCCH/PUSCH are transmitted may be in a consecutive format or a non-consecutive format.

However, it may be assumed that the user equipment knows from which subframe the bundle is being carried out. Moreover, the number of subframes through which PDCCH/EPDCCH/PDSCH/PUCCH/PUSCH are transmitted, the repetition number, or repetition level may be set up differently in accordance with the coverage enhancement level that is required by the user equipment, or may be designated in advance, or may be transmitted from the SIB, or may be estimated by the user equipment (UE).

The MTC device may not necessarily always use all subframes for the transmission/reception of the control channel and the data channel. In some cases, MBSFN subframes or subframes that are configured as special subframes may not be used for the reception/bundling of the control channel and the data channel, and, in order to reduce any influence caused on the operations of the legacy UEs, only some of the subframes may be used for the reception/bundling of the control channel and the data channel of the MTC device.

At this point, the position of the subframe that can be used by the MTC device for the reception/bundling of the control channel and/or the data channel in an uplink and/or downlink environment may correspond to a value that is defined in advance or semi-statically set-up.

In this case, the MTC device may know the position of the subframe that can be used by the MTC device for the reception/bundling of the control channel and/or the data channel in an uplink and/or downlink environment via SIB or RRC signaling.

Hereinafter, a TAR (Total Aggregated Resource) of a (E)PDCCH, which is term that is used in the disclosures of this specification will be described in detail.

Figure 15:
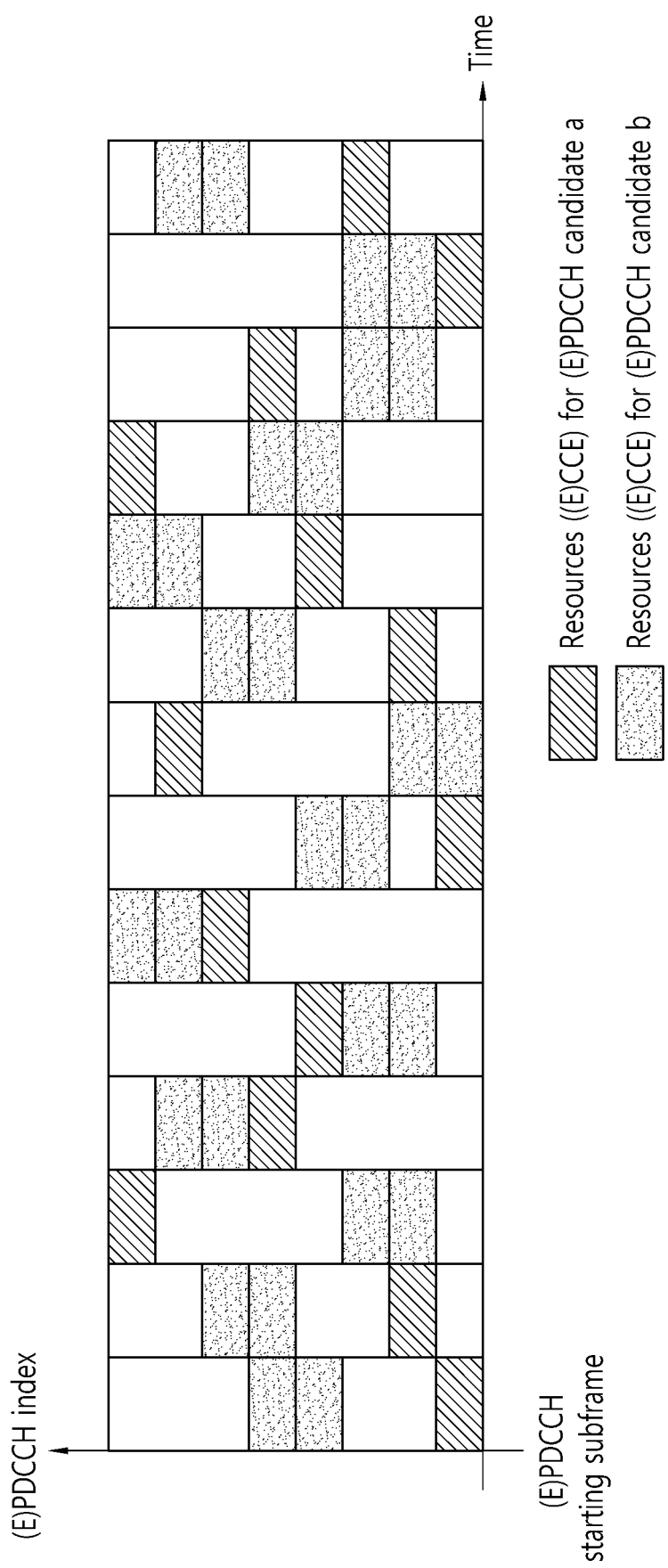
FIG. 15 illustrates an example of a TAR of a (E)PDCCH according to a disclosure of this specification.

FIG. 15 Illustrates an Example of a TAR of a (E)PDCCH According to a Disclosure of this Specification.

The TAR of (E)PDCCH corresponds to a value that is defined for a candidate respective to a channel, which is a decoding target, and the TAR value may be determined based on a repetition number corresponding to the candidate of the channel (or channel candidate) and an amount or number of resources within a subframe (or per subframe). (A Total Aggregated Resource (TAR) can be defined for a decoding candidate such that the TAR is given by Sum($a_i$) where i=0 . . . T−1, where T is repetition number and $a_i$ is the amount of resources in subframe i).

For example, the resource may signify (E)CCE.

Additionally, the number of repetitions may signify a number of subframes being repeatedly transmitted in accordance with the repetition level. For example, in case the repetition number and the repetition level is the same, in case the repetition level is equal to 4, the repetition number may be equal to 4. Additionally, for example, in case the repetition number corresponding to the repetition level is designated in advance, the repetition number corresponding to repetition level 1 may be equal to 2, and the repetition number corresponding to repetition level 2 may be equal to 4.

Therefore, it may be concluded that the TAR value is determined based on a repetition level corresponding to the channel candidate and an amount or number of resources for each subframe.

More specifically, in order to be capable of receiving a (E)PDCCH, which is repeated through multiple subframes and then transmitted from a specific subframe, the user equipment (UE) may monitor two or more (E)PDCCH decoding candidates.

At this point, each of the (E)PDCCH decoding candidates may have the same TAR value or may each be given a different TAR value. More specifically, in order to be capable of receiving a (E)PDCCH, which is repeated through multiple subframes and then transmitted from a specific subframe, the user equipment may monitor at least one TAR respective to the (E)PDCCH decoding candidates at one session.

For example, as shown in FIG. 14, the user equipment may monitor two (E)PDCCH decoding candidates: (E)PDCCH candidate a and (E)PDCCH candidate b.

At this point, the positions and number of (E)CCEs within each subframe through which each (E)PDCCH candidate is being transmitted and the number of subframes through which each (E)PDCCH candidate is being transmitted may be the same or may be different from one another.

At this point, the positions of the (E)CCEs through which each (E)PDCCH candidate may be transmitted may partially overlap one another. In FIG. 14, (E)PDCCH candidate a may be transmitted through 14 subframes and may be transmitted through one (E)CCE within each subframe.

Additionally, (E)PDCCH candidate b may be transmitted through 14 subframes and may be transmitted through two (E)CCEs within each subframe. In this case, (E)PDCCH candidate b has a TAR that is two times larger than (E)PDCCH candidate a.

Meanwhile, hereinafter, the disclosures of this specification provide methods for configuring or deciding repetition levels respective to a control channel and a data channel in a wireless communication environment that requires coverage enhancement.

More specifically, a first disclosure of this specification provides solutions for configuring or deciding repetition levels respective to a PDSCH or PUSCH, and a second disclosure of this specification provides solutions for configuring or deciding repetition levels respective to a PUCCH.

<First Disclosure of this Specification—Repetition Levels of PDSCH/PUSCH>

As described above, the first disclosure of this specification provides solutions for configuring or deciding repetition levels respective to a PDSCH or PUSCH.

More specifically, when the (E)PDCCH is repeated and transmitted through multiple subframes for a MTC device that is located in a coverage enhancement region, the first disclosure of this specification provides solutions for configuring or indicating repetition levels of the PDSCH/PUSCH.

Herein, a repetition level may refer to a repetition number, which corresponds to a predetermined number of subframes that are being repeated and then transmitted (repetition number: subframe number for repetition), or may refer to a value that is determined in correspondence with the repetition number (e.g., a proportional value).

Solution 1-1: The Repetition Level is Determined Based on a TAR Value of a Scheduling (E)PDCCH Herein, Solution 1-1 proposes that the repetition level of the PDSCH/PUSCH, which is scheduled by (E)PDCCH, varies in accordance with the TAR value of the scheduling (E)PDCCH. Alternatively, Solution 1-1 proposes that the repetition level varies in accordance with the TAR value of the most recently received (E)PDCCH.

For example, when a specific user equipment receives a (E)PDCCH that schedules the PDSCH/PUSCH, the specific user equipment may obtain the repetition level of the PDSCH/PUSCH from the TAR value of the corresponding (E)PDCCH. At this point, the repetition level of the PDSCH/PUSCH according to the TAR value of the (E)PDCCH may be defined as a) an equation respective to the TAR of the (E)PDCCH. For example, when alpha is equal to a specific value, the repetition level of the PDSCH/PUSCH may be defined as alpha*(E)PDCCH TAR.

Additionally, b) the repetition level of the PDSCH/PUSCH may be defined in advance in accordance with the TAR value of the (E)PDCCH or a range of TAR values of the (E)PDCCH. For example, when the range of the TAR value of the (E)PDCCH corresponds to 10~14, in case the repetition level of the PDSCH/PUSCH is defined as 20, and, when the range of the TAR value corresponds to 15~20, in case the repetition level of the PDSCH/PUSCH is defined as 40, if the TAR value of the (E)PDCCH, which is received by the user equipment, is equal to 18, the UE may recognize that the repetition level of the PDSCH/PUSCH that the UE is scheduled to receive is equal to 40.

As described above, the repetition level of the PDSCH/PUSCH according to the TAR value of the (E)PDCCH may be defined in a specification (or standard) or may be configured to the user equipment via SIB, RAR, RRC signaling, and so on.

At this point, the (E)PDCCH, which the user equipment characteristically refers to when obtaining the repetition level of the PDSCH/PUSCH, may be limited to a (E)PDCCH having a specific DCI Format.

Solution 1-2: The Repetition is Determined Based on a Maximum TAR Value of Monitoring (E)PDCCH Candidates Herein, in order to decide the repetition level of the PDSCH/PUSCH, which is scheduled by the (E)PDCCH, Solution 1-2 proposes that the repetition level of the PDSCH/PUSCH varies in accordance with a maximum TAR value of the (E)PDCCH decoding candidates, which were monitored by the UE at a time point when the UE was receiving the scheduling (E)PDCCH (or at a time point when the UE was attempting to receive a most recent (E)PDCCH, among the (E)PDCCHs prior to the time point of receiving/transmitting the PDSCH/PUSCH).

More specifically, in case the user equipment monitors (in case the user equipment receives decoding of) multiple (E)PDCCH candidates in order to receive the (E)PDCCH, regardless of the (E)PDCCH candidate through which the user equipment has received the (E)PDCCH, among the TAR values of the corresponding multiple (E)PDCCH candidates, the repetition level of the PDSCH/PUSCH, which is scheduled by the (E)PDCCH, may vary due to the maximum TAR value.

At this point, the repetition level of the PDSCH/PUSCH according to the maximum TAR value respective to the (E)PDCCH candidates, which are monitored by the UE, may be defined as a) an equation respective to the maximum TAR of the (E)PDCCH candidates. For example, when beta is equal to a specific value, and when the maximum TAR value of the (E)PDCCH candidates is equal to max_TAR, the repetition level of the PDSCH/PUSCH may be defined as beta*max_TAR.

Additionally, the repetition level of the PDSCH/PUSCH b) may be defined in advance in accordance with the maximum TAR value of the (E)PDCCH candidates or a range of the maximum TAR values of the (E)PDCCH candidates. For example, when the range of the maximum TAR values of the (E)PDCCH candidates corresponds to 10~14, in case the repetition level of the PDSCH/PUSCH is defined as 20, and, when the range of the maximum TAR values of the (E)PDCCH candidates corresponds to 15~20, in case the repetition level of the PDSCH/PUSCH is defined as 40, if the maximum TAR value of the (E)PDCCH candidates, which the user equipment was monitoring (or attempting to decode), is equal to 18, the UE may recognize that the repetition level of the PDSCH/PUSCH that the UE is scheduled to receive is equal to 40. As described above, the repetition level of the PDSCH/PUSCH according to the maximum TAR value of the monitoring (E)PDCCH candidates is defined in a specification (or standard) or may be configured to the user equipment via SIB, RAR, RRC signaling, and so on.

At this point, the (E)PDCCH, which the user equipment characteristically refers to when obtaining the repetition level of the PDSCH/PUSCH, may be limited to a (E)PDCCH having a specific DCI Format.

Solution 1-3: The Repetition Level is Configured by the DCI and Determined Based on a Specific Value that is Indicated by Each Index The repetition level of the PDSCH/PUSCH, which is scheduled by the (E)PDCCH, may be configured by a DCI, which is transmitted through the scheduling (E)PDCCH. For example, an index r_d (e.g., r_d=0, 1, . . . , N−1) indicating the repetition level may be notified through a MCS field (or another implicit or explicit field) of the DCI.

At this point, the first disclosure of this specification proposes that the value indicated by the PDSCH/PUSCH repetition level index r_d is UE-specific. When r_d may be given a value of {0, 1, . . . , N−1}, the value of the PDSCH/PUSCH repetition level respective to each index value may be equal to $\{v_0, v_1, \ldots, v_{N-1}\}$. (At this point, $v_i \doteq$ signifies a PDSCH/PUSCH value when r_d is equal to i.) In this case, $\{v_0, v_1, \ldots, v_{N-1}\}$, which correspond to PDSCH/PUSCH repetition level values respective to the r_d value, may be set up differently for each user equipment. For example, when r_d is equal to 0 and 1 for UE1, the respective values of $v_0$ and $v_1$ may be equal to 10 and 20, and, when r_d is equal to 0 and 1 for UE2, the respective values of $v_0$ and $v_1$ may be equal to 20 and 40.

The first disclosure of this specification proposes that $\{v_0, v_1, \ldots, v_{N-1}\}$, which correspond to PDSCH/PUSCH repetition level values indicated by the PDSCH/PUSCH repetition level index r_d, varies in accordance with a specific value.

Such specific value may characteristically correspond to an explicit or implicit field value included in the DCI. Alternatively, such specific value may characteristically vary in accordance with a coverage enhancement level that is required by the PDSCH/PUSCH of the user equipment.

Alternatively, such specific value may characteristically vary in accordance with the TAR value of the (E)PDCCH, which schedules the PDSCH/PUSCH of the user equipment. Alternatively, such specific value may vary in accordance with a maximum TAR value of (E)PDCCH candidates, which were monitored (or attempted to be decoded) by the user equipment at a time point of receiving the (E)PDCCH, which schedules the PDSCH/PUSCH of the user equipment.

For example, when considering a case when $\{v_0, v_1, \ldots, v_{N-1}\}$ vary, wherein $\{v_0, v_1, \ldots, v_{N-1}\}$ correspond to PDSCH/PUSCH repetition level values respectively indicated by the PDSCH/PUSCH repetition level index r_d in accordance with the coverage enhancement level that is required for the PDSCH/PUSCH of the UE, in case the coverage enhancement levels required for the PDSCH/PUSCH are respectively equal to 5 dB, 10 dB, and 15 dB, $\{v_0, v_1, v_2\}$ may be respectively interpreted as $\{5, 8, 10\}$, $\{10, 15, 20\}$, and $\{20, 30, 40\}$. Also, as another example, considering a case when $\{v_0, v_1, \ldots, v_{N-1}\}$ vary, wherein $\{v_0, v_1, \ldots, v_{N-1}\}$ correspond to PDSCH/PUSCH repetition level values respectively indicated by the PDSCH/PUSCH repetition level index r_d in accordance with the maximum TAR value of (E)PDCCH candidates, which were monitored (or attempted to be decoded) by the user equipment, in case each of the maximum TAR values of the (E)PDCCH candidates, which were monitored (or attempted to be decoded) by the user equipment, is equal to 10, 20, and 40, $\{v_0, v_1, v_2\}$ may be respectively interpreted as $\{5, 8, 10\}$, $\{10, 15, 20\}$, and $\{20, 30, 40\}$.

As described above, when $\{v_0, v_1, \ldots, v_{N-1}\}$, which correspond to PDSCH/PUSCH repetition level values, vary in accordance with a specific value (e.g., an explicit or implicit value included in the DCI, a coverage enhancement level required for the PDSCH/PUSCH, a TAR of the (E)PDCCH, a maximum TAR of monitoring (E)PDCCH candidates), the $\{v_0, v_1, \ldots, v_{N-1}\}$, which correspond to PDSCH/PUSCH repetition level values respective to such specific value may be defined in a standard or may be set up to the user equipment via SIB, RAR, RRC signaling, and so on.

At this point, the (E)PDCCH, which the user equipment characteristically refers to when obtaining the repetition level of the PDSCH/PUSCH, may be limited to a (E)PDCCH having a specific DCI Format.

<Second Disclosure of this Specification—Repetition Level of PUCCH>

As described above, the second disclosure of this specification provides solutions for configuring or deciding repetition levels respective to a PUCCH.

More specifically, the second disclosure of this specification proposes that a power level or repetition level of the PUCCH is adjusted in order to satisfy the required coverage enhancement, when a MTC device that is located in the coverage enhancement region transmits the PUCCH by using the repetition method.

As a method according to a second disclosure of this specification, a method of a user equipment for transmitting a PUCCH (Physical Uplink Control Channel) may include deciding a repetition level respective to a transmission of a PUCCH including uplink channel information, and repeatedly transmitting the PUCCH over a predetermined number of uplink subframes in accordance with the repetition level respective to the PUCCH The repetition level respective to the PUCCH may be determined based on at least one of previously received PDCCH, EPDCCH, and PDSCH and previously transmitted PUSCH.

Herein, a transmission power respective to the PUCCH may be equally fixed within the predetermined number of uplink subframes.

Additionally, the previously received PDSCH may be scheduled by the previously received PDCCH or EPDCCH, and the PUCCH may include ACK/NACK information respective to the previously received PDSCH.

Additionally, the repetition level respective to the PUCCH may be determined based on a repetition level respective to a most recently received PDCCH or EPDCCH.

Additionally, the repetition level respective to the PUCCH may be determined based on a repetition level respective to a most recently received PDSCH or a most recently transmitted PUSCH.

According to the second disclosure of this specification, the previously received PDCCH may be received by monitoring multiple PDCCH candidates, and the previously received EPDCCH may be received by monitoring multiple EPDCCH candidates.

The repetition level respective to the PUCCH may be determined based on a TAR (Total Aggregation Resource) value of a PDCCH candidate having the previously received PDCCH searched therein, among multiple PDCCH candidates, and a TAR value of the PDCCH candidate may be determined based on a repetition level respective to the previously received PDCCH and a number of resources per subframe.

Additionally, the repetition level respective to the PUCCH may be determined based on a TAR value of an EPDCCH candidate having the previously received EPDCCH searched therein, among multiple EPDCCH candidates, and a TAR value of the EPDCCH candidate may be determined based on a repetition level respective to the previously received EPDCCH and a number of resources per subframe.

Additionally, the repetition level respective to the PUCCH may be determined based on a maximum TAR value respective to the multiple PDCCH candidates, wherein the maximum TAR value may correspond to a TAR value having a maximum value among the TAR values respective to each of the multiple PDCCH candidates, and the TAR values respective to each of the multiple PDCCH candidates may be determined based on a repetition level and a number of resources per subframe respective to each of the multiple PDCCH candidates.

Additionally, the repetition level respective to the PUCCH may be determined based on a maximum TAR value respective to the multiple EPDCCH candidates, wherein the maximum TAR value may correspond to a TAR value having a maximum value among the TAR values respective to each of the multiple EPDCCH candidates, and the TAR values respective to each of the multiple EPDCCH candidates may be determined based on a repetition level and a number of resources per subframe respective to each of the multiple EPDCCH candidates.

Additionally, the repetition level respective to the PUCCH may be determined based on a TPC (Transmit Power Control) field of DCI (Downlink Control Information) included in the previously received PDCCH or EPD- CCH, and each value being indicated by the TPC field may indicate a specific repetition level.

Hereinafter, solutions for adjusting the coverage of the PUCCH according to the second disclosure of this specification will be described, wherein a first aspect of the second disclosure provides a solution for configuring and deciding the repetition level of the PUCCH, and wherein a second aspect of the second disclosure provides a solution for configuring and deciding a transmission power of the PUCCH.

<First Aspect of the Second Disclosure of this Specification—Adjustment of the PUCCH Repetition Level>

As described above, as a solution for adjusting the PUCCH coverage, the first aspect of the second disclosure of this specification provides a solution for configuring, deciding, and adjusting the repetition level of the PUCCH.

More specifically, when the (E)PDCCH is repeated and transmitted through multiple subframes for the coverage enhancement of the MTC device, the first aspect of the second disclosure of this specification proposes a solution for configuring or indicating a repetition level of the PUCCH in accordance with the degree or level of the required coverage enhancement.

Herein, a repetition level may refer to a repetition number, which corresponds to a predetermined number of subframes that are being repeated and then transmitted (repetition number: subframe number for repetition), or may refer to a value that is determined in correspondence with the repetition number (e.g., a proportional value).

In case of obtaining the level of coverage enhancement of the PUCCH by varying the repetition level of the PUCCH, the power of the PUCCH may always be fixed to a maximum transmission power. Although the transmission power of the PUCCH is fixed, the repetition level of the PUCCH may be configured, determined, and adjusted as described below.

Solution 2-A: The Repetition Level may be Determined Based on the Repetition Level of the (E)PDCCH When transmitting A/N (ACK/NACK) information respective to the PDSCH, which is scheduled by the (E)PDCCH, through the PUCCH, Solution 2-A proposes that the repetition level of the PUCCH varies in accordance with the repetition level value of the scheduling (E)PDCCH. Alternatively, when transmitting the PUCCH, Solution 2-A proposes that the repetition level of the PUCCH varies in accordance with the repetition level of the most recently transmitted (E)PDCCH.

For example, when a specific user equipment has received the (E)PDCCH, the repetition level of the PUCCH may be obtained from a repetition level value of the corresponding (E)PDCCH. The repetition level of the PUCCH may be defined by an equation respective to the repetition level of the (E)PDCCH, and the repetition level of the PUCCH may also be defined in advance in accordance with a repetition level value of the (E)PDCCH or a range of the repetition level values of the (E)PDCCH. For example, when the repetition level value of the (E)PDCCH corresponds to 10~14, in case the repetition level of the PUCCH is defined as 5, and, when the repetition level value corresponds to 15~20, in case the repetition level of the PUCCH is defined as 10, if the repetition level value of the (E)PDCCH, which is received by the user equipment, is equal to 18, the UE may recognize that the repetition level of the PUCCH that the UE is scheduled to receive is equal to 10. As described above, the repetition level of the PUCCH according to the repetition level value of the (E)PDCCH is defined in a specification (or standard) or may be configured to the user equipment via SIB, RAR, RRC signaling, and so on.

At this point, the (E)PDCCH, which the user equipment characteristically refers to when obtaining the repetition level of the PUCCH, may be limited to a (E)PDCCH having a specific DCI Format.

Solution 2-B: The Repetition Level may be Determined Based on the Repetition Level of the PDSCH/PUSCH When transmitting A/N (ACK/NACK) information respective to the PDSCH, which is scheduled by the (E)PDCCH, through the PUCCH, Solution 2-B proposes that the repetition level of the PUCCH varies in accordance with the repetition level value of the PDSCH. Alternatively, Solution 2-B proposes that the repetition level of the PUCCH varies in accordance with the repetition level of the most recently received PDSCH or the most recently transmitted PUSCH.

For example, the user equipment may obtain the repetition level of the PUCCH from a repetition level value of the PDSCH or PUSCH. The repetition level of the PUCCH may be defined by an equation respective to the repetition level of the PDSCH or PUSCH, and the repetition level of the PUCCH may also be defined in advance in accordance with a repetition level value or a range of the repetition level values of the PDSCH or PUSCH. For example, when the repetition level value of the PDSCH or PUSCH corresponds to 10~14, in case the repetition level of the PUCCH is defined as 5, and, when the repetition level value corresponds to 15~20, in case the repetition level of the PUCCH is defined as 10, if the repetition level value of the PDSCH or PUSCH, which is received/transmitted by the user equipment, is equal to 18, the UE may recognize that the repetition level of the PUCCH that the UE is scheduled to receive is equal to 10. As described above, the repetition level of the PUCCH according to the repetition level of the PDSCH/PUSCH may be defined in a specification (or standard) or may be configured to the user equipment via SIB, RAR, RRC signaling, and so on.

Solution 2-C: The Repetition Level is Determined Based on a TAR Value of the Scheduling (E)PDCCH When transmitting A/N (ACK/NACK) information respective to the PDSCH, which is scheduled by the (E)PDCCH, through the PUCCH, Solution 2-C proposes that the repetition level of the PUCCH varies in accordance with the TAR value of the scheduling (E)PDCCH.

More specifically, among the (E)PDCCH candidates, the repetition level respective to the PUCCH may be determined based on a TAR value of (E)PDCCH candidates that have searched, detected or received the previously received (E)PDCCH. In other words, among the multiple (E)PDCCH candidates, in case the previously received (E)PDCCH is searched, detected or received by a specific (E)PDCCH candidate, the repetition level respective to the PUCCH may be determined based on the TAR value respective to the specific (E)PDCCH candidate.

Alternatively, when transmitting the PUCCH, Solution 2-C proposes that the repetition level of the PUCCH varies in accordance with the TAR value of the (E)PDCCH that has most recently been transmitted and received.

As described above, the TAR of (E)PDCCH corresponds to a value that is defined for a candidate respective to a channel, which is a decoding target, and the TAR value may be determined based on a repetition number (or repetition level) corresponding to the candidate of the channel (or channel candidate) and an amount (or number) of resources within a subframe (or per subframe).

More specifically, the TAR value of the (E)PDCCH candidate may be determined based on the repetition level or repetition number and the number of resources per subframe respective to the EPDCCH candidate, which has searched the previously received or most recently received (E)PDCCH.

Herein, the resource may correspond to (E)CCE.

For example, when a specific user equipment receives a (E)PDCCH that schedules the PDSCH, the specific user equipment may obtain the repetition level of the PUCCH from the TAR value of the corresponding (E)PDCCH. The repetition level of the PUCCH may be defined by an equation respective to the TAR of the (E)PDCCH or may be defined in advance in accordance with a TAR value of the (E)PDCCH or a range of TAR values of the (E)PDCCH. For example, when the range of the TAR value of the (E)PDCCH corresponds to 10~14, in case the repetition level of the PUCCH is defined as 20, and, when the range of the TAR value corresponds to 15~20, in case the repetition level of the PUCCH is defined as 40, if the TAR value of the (E)PDCCH, which is received by the user equipment, is equal to 18, the UE may recognize that the repetition level of the PUCCH that the UE is scheduled to transmit is equal to 40. As described above, the repetition level of the PUCCH according to the TAR value of the (E)PDCCH is defined in a specification (or standard) or may be configured to the user equipment via SIB, RAR, RRC signaling, and so on. At this point, the (E)PDCCH, which the user equipment refers to when obtaining the repetition level of the PUCCH, may be limited to a (E)PDCCH having a specific DCI Format.

Solution 2-D: The Repetition Level Varies in Accordance with the Maximum TAR Value of the Monitoring (E)PDCCH Candidates When transmitting A/N (ACK/NACK) information respective to the PDSCH, which is scheduled by the (E)PDCCH, through the PUCCH, the present invention proposes that the PUCCH repetition level varies in accordance with maximum TAR values of the (E)PDCCH decoding candidates, which were monitored by the user equipment at a time point of receiving the scheduling (E)PDCCH. Alternatively, the present invention proposes that the PUCCH repetition level varies in accordance with the maximum TAR value of the (E)PDCCH decoding candidates, which were monitored by the UE at a time point when the UE was attempting to receive a most recent (E)PDCCH, among the (E)PDCCHs prior to the time point of transmitting the PUCCH.

More specifically, in case the user equipment monitors (in case the user equipment receives decoding of) multiple (E)PDCCH candidates in order to receive the (E)PDCCH, regardless of the (E)PDCCH candidate through which the user equipment has received the (E)PDCCH, among the TAR values of the corresponding multiple (E)PDCCH candidates, the repetition level of the PUCCH may vary due to the maximum TAR value. The repetition value of the PUCCH may be defined as an equation respective to the maximum TAR of the (E)PDCCH candidates or may be defined in advance in accordance with the maximum TAR value of the (E)PDCCH candidates or a range of the maximum TAR values of the (E)PDCCH candidates.

For example, when the range of the maximum TAR values of the (E)PDCCH candidates corresponds to 10~14, in case the repetition level of the PUCCH is defined as 20, and, when the range of the maximum TAR values of the (E)PDCCH candidates corresponds to 15~20, in case the repetition level of the PUCCH is defined as 40, if the maximum TAR value of the (E)PDCCH candidates, which the user equipment was monitoring (or attempting to decode), is equal to 18, the UE may recognize that the repetition level of the PUCCH that the UE is scheduled to receive is equal to 40.

As described above, the repetition level of the PUCCH according to the maximum TAR value of the monitoring (E)PDCCH candidates is defined in a specification (or standard) or may be configured to the user equipment via SIB, RAR, RRC signaling, and so on.

At this point, the (E)PDCCH, which the user equipment refers to when obtaining the repetition level of the PUCCH, may be limited to a (E)PDCCH having a specific DCI Format.

Solution 2-E: The Repetition Level is Determined by an Indication Through the DCI (Indication Through a TPC Field)

In case a MTC device that is located in a coverage enhancement region (MTC UE in coverage enhancement) transmits the PUCCH, Solution 2-E proposes that the repetition level of the PUCCH is notified through a TPC field or another explicit field of the DCI, which is transmitted through the (most recently received) (E)PDCCH. Solution 2-E may also be applied to a method for deciding the repetition level of the PUSCH.

Most particularly, in case of adjusting the level of coverage enhancement of the PUCCH by having the transmission power of the PUCCH fixed to a maximum power and by varying the repetition level, the TPC field of the DCI may be used for the purpose of adjusting the repetition level of the PUCCH and not for the purpose of adjusting the transmission power of the PUCCH. At this point, each value indicated by the TPC field may indicate a specific repetition level or repetition number. For example, when the TPC field is configured of 2 bits, the value 00 of the TPC field may indicate PUCCH Repetition Level 1 (PUCCH transmission through 1 subframe), the value 01 of the TPC field may indicate PUCCH Repetition Level 5 (PUCCH transmission through 5 subframes), the value 10 of the TPC field may indicate PUCCH Repetition Level 10 (PUCCH transmission through 10 subframes), and the value 11 of the TPC field may indicate PUCCH Repetition Level 15 (PUCCH transmission through 15 subframes).

<Second Aspect of the Second Disclosure of this Specification—Adjustment of the PUCCH Transmission Power>

As described above, as a solution for adjusting the PUCCH coverage, the second aspect of the second disclosure of this specification provides a solution for configuring, deciding, and adjusting the transmission power of the PUCCH.

The second aspect of the second disclosure of this specification may also be applied to a solution for configuring, deciding, and adjusting the transmission power of the PUSCH within an applicable range.

When the (E)PDCCH is repeated and transmitted through multiple subframes for the MTC device that is located in the coverage enhancement region, the second aspect of the second disclosure of this specification proposes a solution for configuring/indicating the transmission power of the PUCCH in accordance with a required level of coverage enhancement. In case the level of coverage enhancement of the PUCCH is obtained by varying the transmission power of the PUCCH, the repetition level of the PUCCH may be determined as described below.

a) The repetition level of the PUCCH may be fixed to a specific value that is defined in the specification.

b) The repetition level of the PUCCH may be determined in correlation with a repetition level of the PRACH, which has been successfully transmitted to the base station by the UE. At this point, the PUCCH repetition level value respective to the PRACH repetition level may be defined in a specification (or standard) or may be configured to the user equipment via SIB, RAR, RRC signaling, and so on. At this point, in case the PUCCH is characteristically required to be transmitted before receiving configurations of the PUCCH repetition level, the user equipment may use a maximum PUCCH repetition level that is defined in the specification or SIB.

c) The repetition level of the PUCCH may be configured to the user equipment through the RAR. When the base station (eNodeB), which has received the PRACH from the user equipment, transmits a RAR to the user equipment, information on the PUCCH repetition level of the user equipment may be included in the RAR and then be transmitted.

d) The repetition level of the PUCCH may be determined in correlation with the repetition level of the RAR. The PUCCH repetition level value respective to the PRACH repetition level may be defined in a specification (or standard) or may be configured to the user equipment via SIB, RAR, RRC signaling, and so on. At this point, in case the PUCCH is characteristically required to be transmitted before receiving configurations of the PUCCH repetition level, the user equipment may use a maximum PUCCH repetition level that is defined in the specification or SIB.

e) The repetition level of the PUCCH may be configured semi-statically via SIB or RRC signaling. At this point, in case the PUCCH is characteristically required to be transmitted before receiving configurations of the PUCCH repetition level, the user equipment may use a maximum PUCCH repetition level that is defined in the specification or SIB.

f) The repetition level of the PUCCH may be determined in correlation with the coverage enhancement level of the (E)PDCCH/PDSCH/PUSCH. The repetition level value of the PUCCH respective to the (E)PDCCH/PDSCH/PUSCH repetition level may be defined in the specification or may be configured to the user equipment via SIB, RAR, RRC signaling, and so on. At this point, in case the PUCCH is characteristically required to be transmitted before receiving configurations of the PUCCH repetition level, the user equipment may use a maximum PUCCH repetition level that is defined in the specification or SIB.

g) The repetition level of the PUCCH may vary in accordance with the maximum TAR values of the monitoring (E)PDCCH candidates (the most recent monitoring (E)PDCCH candidates prior to transmitting the PUCCH). The repetition level value of the PUCCH respective to the maximum TAR values of the monitoring (E)PDCCH candidates may be defined in the specification or may be configured to the user equipment via SIB, RAR, RRC signaling, and so on.

Meanwhile, if the repetition level of the PUCCH is determined as described above, the level of coverage enhancement may be adjusted by adjusting the PUCCH transmission power of the user equipment. The solution for adjusting the transmission power of the PUCCH may be proposed as described below.

Solution 3-A: The Transmission Power is Adjusted in Accordance with the Repetition Level of the (E)PDCCH When A/N information respective to the PDSCH, which is scheduled by the (E)PDCCH, is transmitted through the PUCCH, Solution 3-A proposes that the PUCCH transmission power varies in accordance with the repetition level value of the scheduling (E)PDCCH. Alternatively, Solution 3-A proposes that the transmission power of the PUCCH varies in accordance with the repetition level of the most recently transmitted (E)PDCCH.

For example, when a specific user equipment has received the (E)PDCCH, the specific user equipment may acquire a transmission power value of the PUCCH from a repetition level value of the corresponding (E)PDCCH or a $\delta_{PUCCH}$ value, which is defined in section 5.1.2.1 (based on V11.4.0) of TS36.213. The transmission power value of the PUCCH or the $\delta_{PUCCH}$ value may be defined in an equation respective to the repetition level of the (E)PDCCH or may be defined in advance in accordance with a repetition level value of the (E)PDCCH or a range of repetition level values of the (E)PDCCH. For example, when the repetition level value of the (E)PDCCH corresponds to 1-4, the $\delta_{PUCCH}$ value that is defined in section 5.1.2.1 (based on V11.4.0) of TS36.213 may be defined as −1, when the repetition level value of the (E)PDCCH corresponds to 5~9, the $\delta_{PUCCH}$ value may be defined as 0, when the repetition level value of the (E)PDCCH corresponds to 10~14, the $\delta_{PUCCH}$ value may be defined as 1, and when the repetition level value of the (E)PDCCH corresponds to 15~20, the $\delta_{PUCCH}$ value may be defined as 3. In this case, when the (E)PDCCH repetition level that is received by the user equipment is equal to 18, the user equipment may recognize the $\delta_{PUCCH}$ value to be equal to 3, thereby being capable of calculating the PUCCH transmission power accordingly. As described above, the transmission power of the PUCCH respective to the repetition level of the (E)PDCCH may be defined in a specification (or standard) or may be configured to the user equipment via SIB, RAR, RRC signaling, and so on.

At this point, the (E)PDCCH, which the user equipment refers to when obtaining the repetition level of the PUCCH, may be limited to a (E)PDCCH having a specific DCI Format.

Solution 3-B: The Transmission Power is Adjusted Based on the Repetition Level of the PDSCH/PUSCH When A/N information respective to the PDSCH, which is scheduled by the (E)PDCCH, is transmitted through the PUCCH, Solution 3-B proposes that the PUCCH transmission power varies in accordance with the repetition level value of the PDSCH. Alternatively, Solution 3-B proposes that the transmission power of the PUCCH varies in accordance with the repetition level of the most recently received PDSCH or the most recently transmitted PUSCH.

For example, a specific user equipment may acquire a transmission power value of the PUCCH from a repetition level value of the PDSCH or PUSCH or $\delta_{PUCCH}$ value, which is defined in section 5.1.2.1 (based on V11.4.0) of TS36.213. The transmission power value of the PUCCH or the $\delta_{PUCCH}$ value may be defined in an equation respective to the repetition level of the PDSCH or PUSCH or may be defined in advance in accordance with a repetition level value or a range of repetition level values of the PDSCH or PUSCH. For example, when the repetition level value of the PDSCH/PUSCH corresponds to 1~4, the $\delta_{PUCCH}$ value that is defined in section 5.1.2.1 (based on V11.4.0) of TS36.213 may be defined as −1, when the repetition level value of the PDSCH/PUSCH corresponds to 5~9, the $\delta_{PUCCH}$ value may be defined as 0, when the repetition level value of the PDSCH/PUSCH corresponds to 10~14, the $\delta_{PUCCH}$ value may be defined as 1, and when the repetition level value of the PDSCH/PUSCH corresponds to 15~20, the $\delta_{PUCCH}$ value may be defined as 3. In this case, when the PDSCH/PUSCH repetition level that is received/transmitted by the user equipment is equal to 18, the user equipment may recognize the $\delta_{PUCCH}$ value to be equal to 3, thereby being capable of calculating the PUCCH transmission power accordingly. As described above, the transmission power of the PUCCH respective to the repetition level of the PDSCH/

PUSCH may be defined in a specification (or standard) or may be configured to the user equipment via SIB, RAR, RRC signaling, and so on.

Solution 3-C: The Transmission Power is Adjusted Based on the TAR Value of the Scheduling (E)PDCCH When A/N information respective to the PDSCH, which is scheduled by the (E)PDCCH, is transmitted through the PUCCH, Solution 3-C proposes that the PUCCH transmission power varies in accordance with the TAR value of the scheduling (E)PDCCH. Alternatively, Solution 3-C proposes that the transmission power of the PUCCH varies in accordance with TAR value of the most recently transmitted (E)PDCCH.

For example, when a specific user equipment has received a (E)PDCCH, which schedules the PDSCH, the specific user equipment may acquire a transmission power value of the PUCCH from a TAR value of the corresponding (E)PDCCH or a $\delta_{PUCCH}$ value, which is defined in section 5.1.2.1 (based on V11.4.0) of TS36.213. The transmission power value of the PUCCH or the $\delta_{PUCCH}$ value may be defined in an equation respective to the TAR of the (E)PDCCH or may be defined in advance in accordance with the TAR value of the (E)PDCCH or a range of TAR values of the (E)PDCCH. For example, when the TAR value of the (E)PDCCH corresponds to 1~4, the $\delta_{PUCCH}$ value that is defined in section 5.1.2.1 (based on V11.4.0) of TS36.213 may be defined as −1, when the TAR value of the (E)PDCCH corresponds to 5~9, the $\delta_{PUCCH}$ value may be defined as 0, when the TAR value of the (E)PDCCH corresponds to 10~14, the $\delta_{PUCCH}$ value may be defined as 1, and when the TAR value of the (E)PDCCH corresponds to 15~20, the $\delta_{PUCCH}$ value may be defined as 3. In this case, when the TAR value of the (E)PDCCH that is received by the user equipment is equal to 18, the user equipment may recognize the $\delta_{PUCCH}$ value to be equal to 3, thereby being capable of calculating the PUCCH transmission power accordingly. As described above, the transmission power of the PUCCH respective to the TAR value of the (E)PDCCH may be defined in a specification (or standard) or may be configured to the user equipment via SIB, RAR, RRC signaling, and so on.

At this point, the (E)PDCCH, which the user equipment refers to when obtaining the repetition level of the PUCCH, may be limited to a (E)PDCCH having a specific DCI Format.

Solution 3-D: The Transmission Power is Adjusted Based on the Maximum TAR Value of the Monitoring (E)PDCCH Candidates When A/N information respective to the PDSCH, which is scheduled by the (E)PDCCH, is transmitted through the PUCCH, Solution 3-D proposes that the PUCCH transmission power varies in accordance with maximum TAR values of the (E)PDCCH decoding candidates, which were monitored by the user equipment at a time point of receiving the scheduling (E)PDCCH. Alternatively, Solution 3-D proposes that the PUCCH transmission power varies in accordance with the maximum TAR value of the (E)PDCCH decoding candidates, which were monitored by the UE at a time point when the UE was attempting to receive a most recent (E)PDCCH, among the (E)PDCCHs prior to the time point of transmitting the PUCCH.

More specifically, in case the user equipment monitors (in case the user equipment receives decoding of) multiple (E)PDCCH candidates in order to receive the (E)PDCCH, regardless of the (E)PDCCH candidate through which the user equipment has received the (E)PDCCH, among the TAR values of the corresponding multiple (E)PDCCH candidates, the transmission power value of the PUCCH or a $\delta_{PUCCH}$ value, which is defined in section 5.1.2.1 (based on V11.4.0) of TS36.213, may be varied due to the maximum TAR value. The transmission power value of the PUCCH or the $\delta_{PUCCH}$ value may be defined in an equation respective to the maximum TAR of the (E)PDCCH candidates or may be defined in advance in accordance with the maximum TAR value of the (E)PDCCH candidates or a range of maximum TAR values of the (E)PDCCH candidates.

For example, when the maximum TAR value of the monitoring (E)PDCCH candidates corresponds to 1~4, the $\delta_{PUCCH}$ value that is defined in section 5.1.2.1 (based on V11.4.0) of TS36.213 may be defined as −1, when the maximum TAR value corresponds to 5~9, the $\delta_{PUCCH}$ value may be defined as 0, when the maximum TAR value corresponds to 10~14, the $\delta_{PUCCH}$ value may be defined as 1, and when the maximum TAR value corresponds to 15~20, the $\delta_{PUCCH}$ value may be defined as 3. In this case, when the maximum TAR value of the (E)PDCCH candidates that are monitored by the user equipment is equal to 18, the user equipment may recognize the $\delta_{PUCCH}$ value to be equal to 3, thereby being capable of calculating the PUCCH transmission power accordingly. As described above, the transmission power of the PUCCH respective to the maximum TAR value of the monitoring (E)PDCCH candidates may be defined in a specification (or standard) or may be configured to the user equipment via SIB, RAR, RRC signaling, and so on. At this point, the (E)PDCCH, which the user equipment refers to when obtaining the repetition level of the PUCCH, may be limited to a (E)PDCCH having a specific DCI Format.

Solution 3-E: The Transmission Power is Adjusted Based on an Indication Through the DCI (Indication Through a TPC Field)

In the present invention, in case a MTC device that is located in a coverage enhancement region transmits a PUCCH, the transmission power of the PUCCH may be notified through a TPC field of a DCI, which is transmitted through (the most recently transmitted) (E)PDCCH.

<Additional Disclosures of this Specification—Application of the TPC Field>

As described above, when a MTC device that is located in a coverage enhancement region transmits a PUCCH by using a repetition method, in order to satisfy the required coverage enhancement, the power level or repetition level of the PUCCH may be adjusted.

According to the additional disclosures of this specification, the repetition level or transmission power ($\delta_{PUCCH}$ value) of the PUCCH may be set up through the TPC field of the DCI. The TPC field of the DCI a) may be used for notifying the transmission power ($\delta_{PUCCH}$ value) of the PUCCH, or b) may be used for notifying the repetition level of the PUCCH.

More specifically, an indication attribute of the TPC field may be determined as any one of a) an indication of the transmission power ($\delta_{PUCCH}$ value) of the PUCCH, and b) an indication of the repetition level of the PUCCH, and, herein, the indication attribute of the TPC field may be determined in accordance with whether the user equipment is being operated in a normal coverage mode or an enhanced coverage mode.

For example, in case the user equipment is located in a normal coverage region, the TPC field may indicate the transmission power of the PUCCH, and, in case the user equipment is located in an enhanced coverage region, the TPC field may indicate the repetition level of the PUCCH.

At this point, the additional disclosure of this specification proposes that the decision on which of the two purposes a)

and b) of the TPC field is to be used for the coverage enhancement should be defined in the specification (or standard) or configured to the user equipment via MIB, SIB, RAR, and so on. At this point, in case of characteristically using the TPC field for the purpose of a) or b), the TPC field may be limited to a case when the TPC field is not being used as an ARI (ACK/NACK resource indicator).

Figure 16:
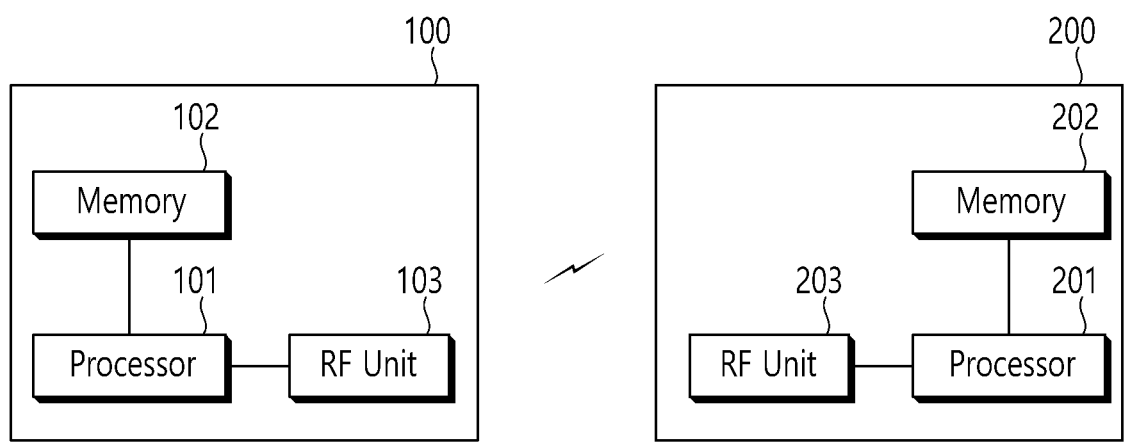
FIG. 16 illustrates a block diagram showing a wireless communication system in which the disclosure of this specification is implemented.

FIG. 16 Illustrates a Block Diagram Showing a Wireless Communication System in which the Disclosure of this Specification is Implemented.

The base station 200 includes a processor 201, a memory 202, and a RF (radio frequency) unit 203. The memory 202 is connected to the processor 201 and stores diverse information for driving the processor 201. The RF unit 203 is connected to the processor 201, thereby being capable of transmitting and/or receiving radio signals. The processor 201 implements the proposed functions, processes, and/or methods. In the above-described exemplary embodiments, the operations of the base station may be implemented by the processor 201.

The MTC device 100 includes a processor 101, a memory 102, and a RF unit 103. The memory 102 is connected to the processor 101 and stores diverse information for driving the processor 101. The RF unit 103 is connected to the processor 101, thereby being capable of transmitting and/or receiving radio signals. The processor 101 implements the proposed functions, processes, and/or methods. In the above-described exemplary embodiments, the operations of the base station may be implemented by the processor 101.

The processor may include an ASIC (application-specific integrated circuit), another chip set, a logical circuit, and/or a data processing device. The memory include a ROM (read-only memory), a RAM (random access memory), a flash memory, a memory card, a storage medium, and/or another storage device. The RF unit may include one or more antennas transmitting and/or receiving radio signals. When the exemplary embodiment is implemented as software, the above-described method may be implemented as a module (process, function, and so on) performing the above-described functions. The module may be stored in the memory and may be executed by the processor. The memory may be located inside or outside of the processor and may be connected to the processor through a diversity of well-known means.

As a user equipment according to a disclosure of this specification, a user equipment for transmitting a PUCCH (Physical Uplink Control Channel) includes a RF unit, and a processor configured to control the RF unit, so as to decide a repetition level respective to a transmission of a PUCCH including uplink channel information, and to repeatedly transmit the PUCCH over a predetermined number of uplink subframes in accordance with the repetition level respective to the PUCCH, wherein the repetition level respective to the PUCCH may be determined based on at least one of previously received PDCCH, EPDCCH, and PDSCH and previously transmitted PUSCH.

Herein, a transmission power respective to the PUCCH may be equally fixed within the predetermined number of uplink subframes.

Additionally, the previously received PDSCH may be scheduled by the previously received PDCCH or EPDCCH, and the PUCCH may include ACK/NACK information respective to the previously received PDSCH, and the repetition level respective to the PUCCH may be determined based on a repetition level respective to a most recently received PDCCH or EPDCCH.

Additionally, the repetition level respective to the PUCCH may be determined based on a repetition level respective to a most recently received PDSCH or a most recently transmitted PUSCH.

In the above-described exemplary system, although the methods are described based on a flow chart by using a series of process steps and blocks, the present invention will not be limited only to the order of the given process steps, and some process steps may be carried out in an order that is different from the one that is described above or may be carried out simultaneously. Additionally, it will be apparent to anyone skilled in the art that the process steps shown in the flow chart are not exclusive and that other process steps may be included and that one or more process steps of the flow chart may be deleted without causing any influence on the scope of the present invention.

What is claimed is:

1. A method for determining a number of subframes for repetitions of a physical downlink shared channel (PDSCH), the method performed by a device and comprising:
   receiving radio resource control (RRC) signals including first information representing at least one repetition level, among a plurality of repetition levels of the PDSCH,
   wherein the at least one repetition level in the first information of the RRC signals indicates a set of plural repetition numbers of the PDSCH;
   receiving a downlink control channel,
   wherein the downlink control channel includes an index,
   wherein the index is expressed as one value of $\{0, 1, 2, \ldots N-1\}$, where N is a size of the set, and
   wherein the one value represents one in the set of plural repetition numbers of the PDSCH which are indicated by the at least one repetition level in the RRC signals;
   determining the at least one repetition level according to a total aggregated resource (TAR) of the downlink control channel; and
   determining the number of subframes for repetitions of the PDSCH, based on both of the set of plural repetition numbers of the PDSCH indicated by the at least one repetition level in the RRC signals and the one value of the index included in the downlink control channel.

2. The method of claim 1, further comprising:
   receiving a system information block (SIB) including second information used to indicate valid downlink subframes used for repetitions of the downlink control channel and for repetitions of the PDSCH,
   wherein the valid downlink subframes indicated by the second information in the SIB do not include a multicast-broadcast single-frequency network (MBSFN) subframe, and
   wherein the MBSFN subframe is not the valid downlink subframes used for repetitions of the downlink control channel and for the repetitions of the PDSCH.

3. The method of claim 1, wherein the downlink control channel is not repeatedly received on a time division duplex (TDD) special subframe.

4. The method of claim 1, further comprising:
   determining a last subframe, on which repetitions of the downlink control channel are completed; and
   determining a start subframe to receive repetitions of the PDSCH, based on the last subframe.

5. The method of claim 1, wherein the RRC signals further include information specifying a repetition level of a physical uplink shared channel (PUSCH).

6. The method of claim 5, further comprising:
receiving repetitions of a second downlink control channel,
wherein the second downlink control channel includes information on an index indicating one among repetition numbers of the PUSCH based on the repetition level of the PUSCH specified in the RRC signals; and
determining a repetition number of the PUSCH, among the repetition numbers, based on the index in the second downlink control channel.

7. The method of claim 1, wherein the downlink control channel including the index has a specific downlink control information (DCI) format.

8. The method of claim 1, further comprising:
transmitting a physical uplink control channel (PUCCH) signal which is repeated over a plurality of uplink subframes,
wherein an uplink transmission power for the PUCCH signal is fixed during the repetition over the plurality of uplink subframes.

9. The method of claim 1, wherein the RRC signals further include information used to determine a location of a start subframe where repetitions of the downlink control channel are to be started.

10. A device for determining a number of subframes for repetitions of a physical downlink shared channel (PDSCH), the device comprising:
a transceiver configured to:
receive radio resource control (RRC) signals including first information representing at least one repetition level, among a plurality of repetition levels of the PDSCH,
wherein the at least one repetition level in the first information of the RRC signals indicates a set of plural repetition numbers of the PDSCH,
receive a downlink control channel,
wherein the downlink control channel includes an index,
wherein the index is expressed as one value of {0, 1, 2, . . . N−1}, where N is a size of the set, and
wherein the one value represents one in the set of plural repetition numbers of the PDSCH which are indicated by the at least one repetition level specified in the RRC signals; and
a processor configured to:
determine the at least one repetition level according to a total aggregated resource (TAR) of the downlink control channel, and
determine the number of subframes for repetitions of the PDSCH, based on both of the set of plural repetition numbers of the PDSCH indicated by the at least one repetition level in the RRC signals and the one value of the index included in the downlink control channel.

11. The device of claim 10, wherein the processor controls the transceiver to receive a system information block (SIB) including second information used to indicate valid downlink subframes used for repetitions of the downlink control channel and for repetitions of the PDSCH,
wherein the valid downlink subframes indicated by the second information in the SIB do not include a multicast-broadcast single-frequency network (MBSFN) subframe, and
wherein the MBSFN subframe is not the valid downlink subframes used for repetitions of the downlink control channel and for the repetitions of the PDSCH.

12. The device of claim 10, wherein the downlink control channel is not repeatedly received on a time division duplex (TDD) special subframe.

13. The device of claim 10, wherein the processor is further configured to:
determine a last subframe, on which repetitions of the downlink control channel are completed, and
determine a start subframe to receive repetitions of the PDSCH, based on the last subframe.

14. The device of claim 10, wherein the RRC signals further include information specifying a repetition level of a physical uplink shared channel (PUSCH).

15. The device of claim 14, wherein the transceiver is further configured to:
receive repetitions of a second downlink control channel,
wherein the second downlink control channel includes information on an index indicating one among repetition numbers of the PUSCH based on the repetition level of the PUSCH specified in the RRC signals, and
wherein the processor is further configured to: determine a repetition number of the PUSCH, among the repetition numbers, based on the index in the second downlink control channel.

* * * * *